Jan. 3, 1950 W. H. BOGHOSIAN ET AL 2,493,183
ARTILLERY DIRECTOR
Filed May 21, 1942 7 Sheets-Sheet 3

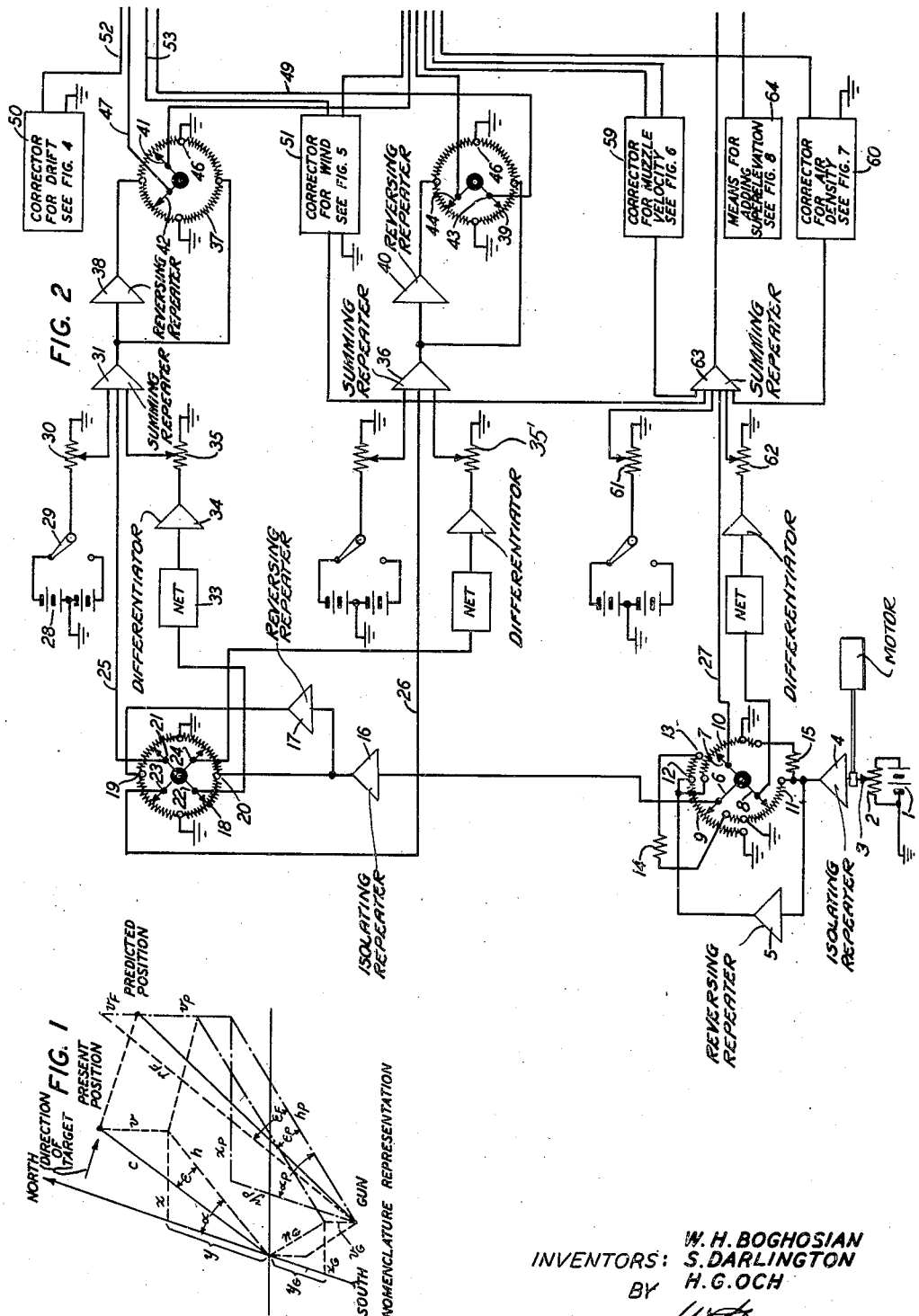

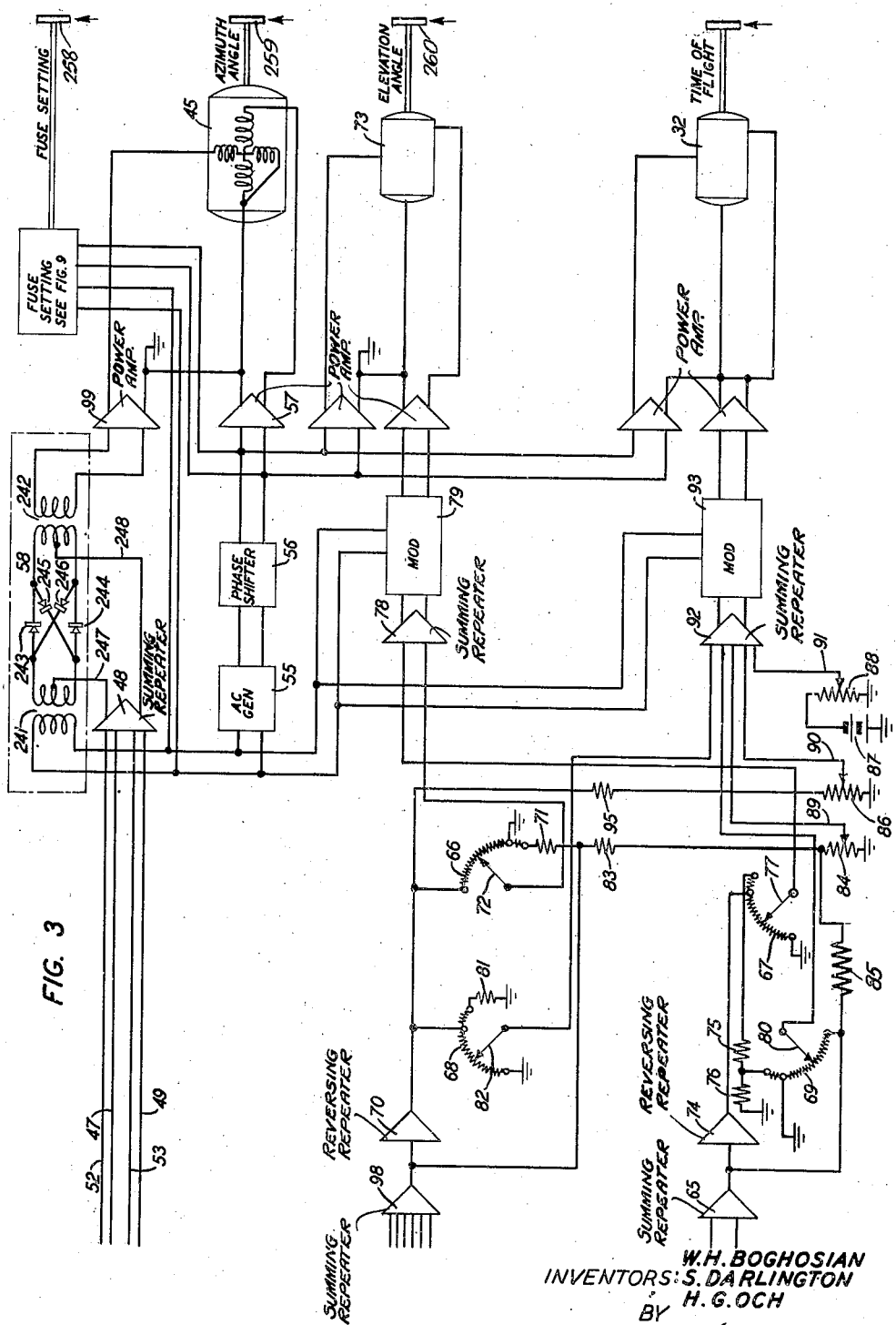

INVENTORS: W. H. BOGHOSIAN
S. DARLINGTON
H. G. OCH
BY
M. R. Dawson
ATTORNEY

Jan. 3, 1950 W. H. BOGHOSIAN ET AL 2,493,183
ARTILLERY DIRECTOR
Filed May 21, 1942 7 Sheets-Sheet 4

INVENTORS: W.H. BOGHOSIAN
S. DARLINGTON
H.G. OCH
BY
*M. R. Dawson*
ATTORNEY

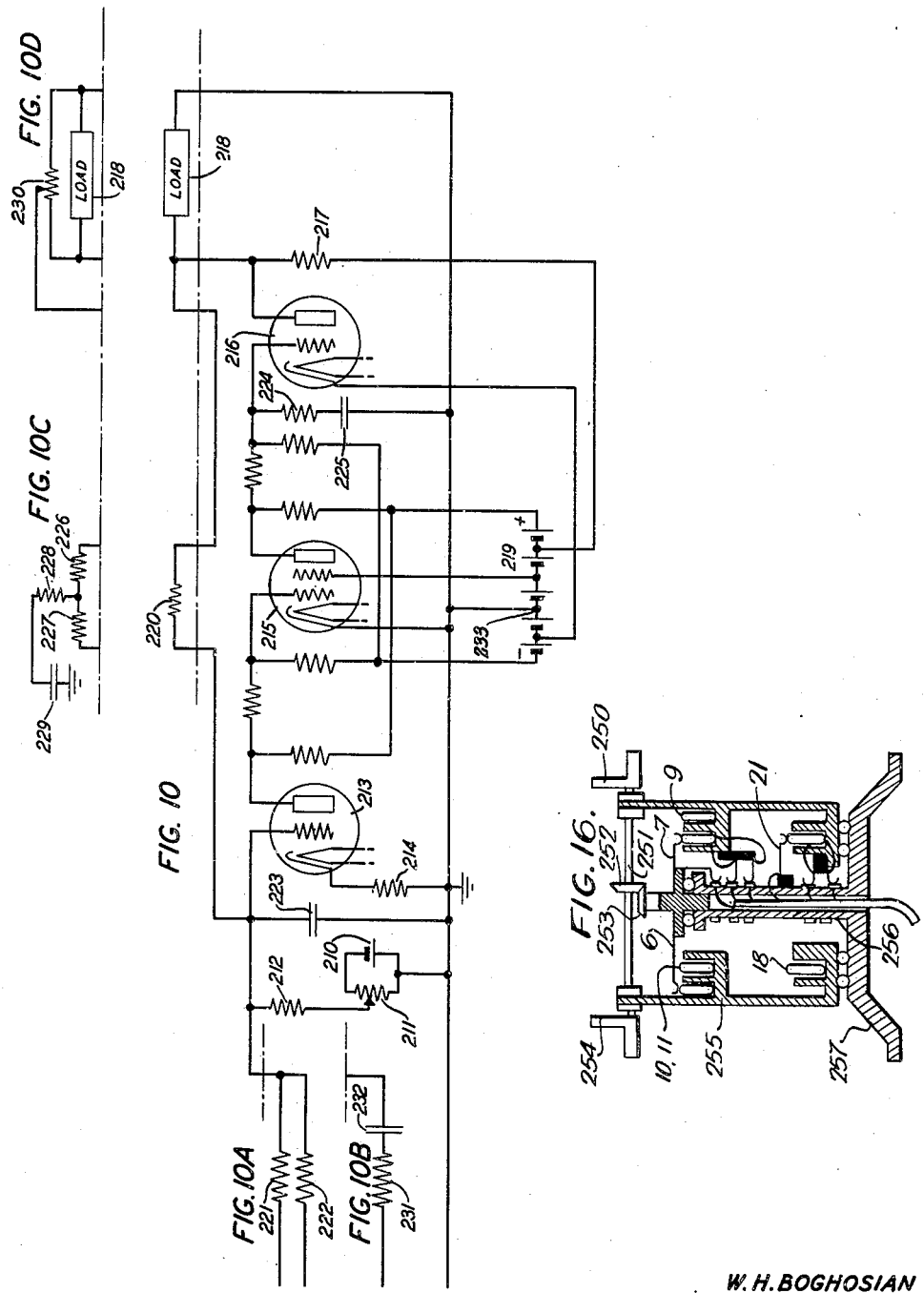

Jan. 3, 1950     W. H. BOGHOSIAN ET AL     2,493,183
ARTILLERY DIRECTOR
Filed May 21, 1942     7 Sheets-Sheet 6
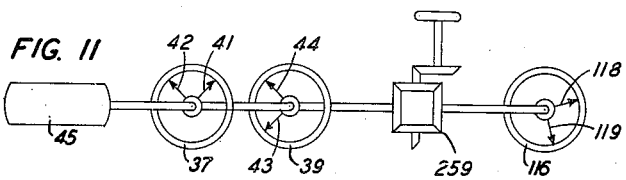
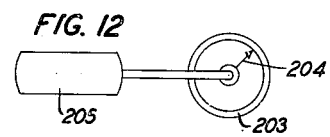
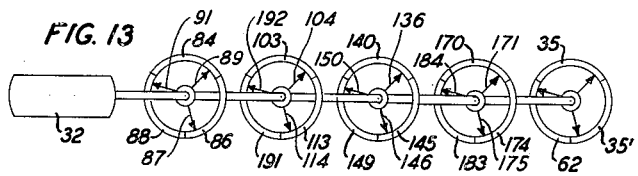
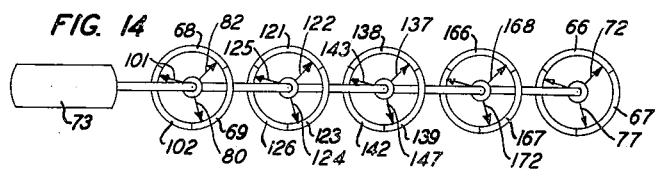
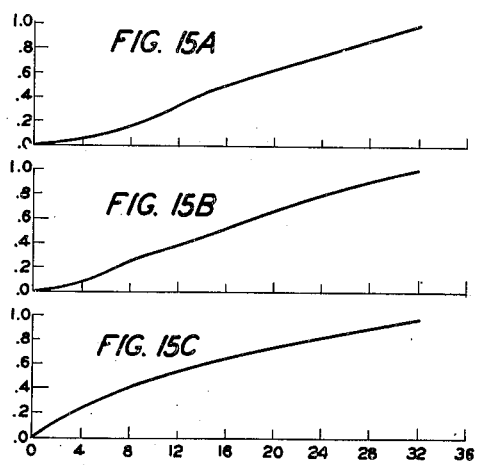
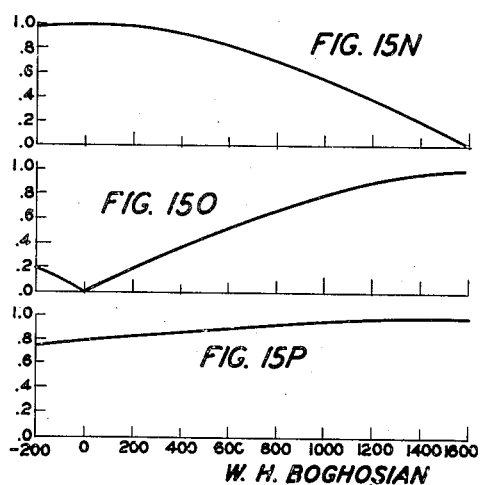
INVENTORS: W. H. BOGHOSIAN
S. DARLINGTON
H. G. OCH
BY W. L. Dawson
ATTORNEY.

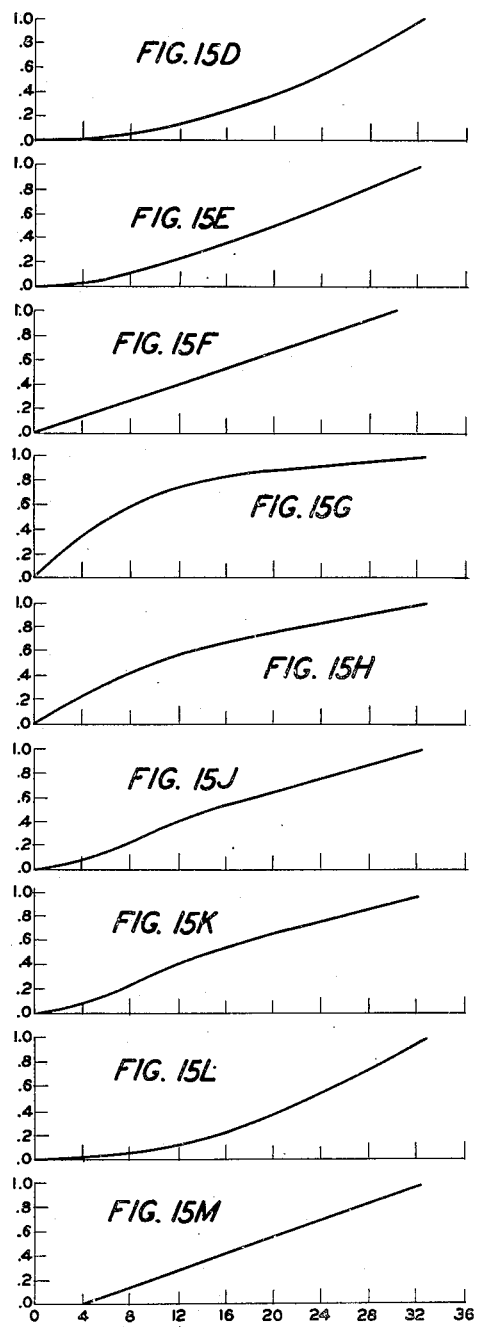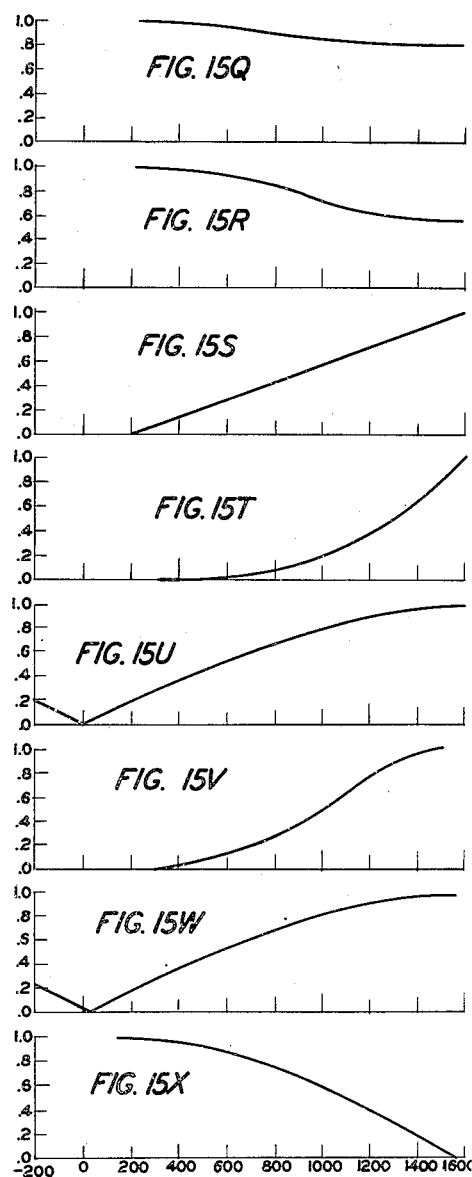

Patented Jan. 3, 1950

2,493,183

UNITED STATES PATENT OFFICE 2,493,183

ARTILLERY DIRECTOR

William H. Boghosian, Forest Hills, and Sidney Darlington, New York, N. Y., and Henry G. Och, West Englewood, N. J., assignors to Bell Telephone Laboratories, Incorporated, New York, N. Y., a corporation of New York Application May 21, 1942, Serial No. 443,920

24 Claims. (Cl. 235—61.5)

This invention relates to means for directing gunfire against a moving target, and particularly to such means in which the data are expressed in the form of electrical quantities. The data obtained from observations of the present position and movement of the target are converted into voltages representing the rectangular coordinates with respect to the gun of the predicted future position of the target. To these voltages are added other voltages representing the superelevation and the differential ballistic corrections for the effects of wind, drift, and non-standard muzzle velocity and air density on the gun and shell to produce voltages representing the coordinates of a firing target, such that, if the gun is fired under existing conditions at the firing target, the shell will explode at the predicted future position. The combined voltages control the production of mechanical movements proportional to the firing azimuth and quadrant elevation of the gun, and the time of flight of the shell.

The object of the invention is to correct the data for the drift of the shell, the muzzle velocity of the gun, the magnitude and direction of the wind and the density of the air; to modify the data for the required superelevation of the gun; and to determine the correct fuse setting for the corrected data and the dead time.

A feature of the invention is a method and means for expressing the corrections in the form of electrical voltages modified in accordance with the time of flight of the shell, and for simultaneously modifying the representation of the time of flight in accordance with the corrections.

Another feature of the invention is a method and means for expressing the corrections in the data in the form of electrical voltages modified in accordance with the quadrant angle and simultaneously modifying the representation of the quadrant angle in accordance with the corrections in the data.

Another feature of the invention is a method and means for expressing the components of the magnitude of the ballistic wind in the form of electrical voltages modified in accordance with the time of flight of the shell and the quadrant angle of the gun.

Another feature of the invention is a method and means for expressing the corrections for muzzle velocity in the form of electrical voltages modified in accordance with the time of flight of the shell and the quadrant angle of the gun.

In accordance with the invention the various data observed in connection with a moving target toward which a gun is to be aimed, such as slant range and angular elevation of the target, are converted to magnitudes of electric voltage. These magnitudes are then multiplied or added and the resultant is similarly combined with additional observed data, the final voltage magnitudes operating to control the movements of multiphase motors each of which assumes a position to indicate or to control one component in the aiming of the gun.

In order to convert data into electrical magnitudes potentiometers are employed with movable wipers either manually operated or geared to and moved by the observing or tracking instruments. Accordingly, the position of the observing instrument causes the wiper to assume a corresponding position so that there may be derived from the potentiometer an electromotive force indicative of that position. To add to an electrical magnitude thus obtained, as may be necessary when a correction factor is to be introduced, it is merely necessary to impress the electromotive forces to be added in series aiding or opposing relation as the case may require. When it is desired to multiply as, for example, in obtaining horizontal distance of the target from the slant range and the angle of elevation of the target one may impress an electromotive force proportional to the slant range upon a circular potentiometer, the unit length resistance of which varies with the sine of the wiper angle and may gear the radius rod of the wiper to the angular elevation observing instrument. Consequently the electromotive force derived from the wiper will be proportional to the product of the slant range and the cosine of the elevation angle or in other words will be proportional to the horizontal distance to the target.

The broad idea of a director in which the data are expressed in the form of electrical quantities is disclosed in United States Patent 2,408,081, patented Sept. 24, 1946, by C. A. Lovell et al. and assigned to the assignee of the present application. The scope of the present invention is defined in the claims.

The invention will be better understood from the following description, and the drawings, in which:

Fig. 1 is a representation of the geometric factors involved in converting observed data to quantities which may be used in laying a gun;

Figs. 2 and 3 are a diagrammatic and schematic representation of the complete director;

Figure 5:
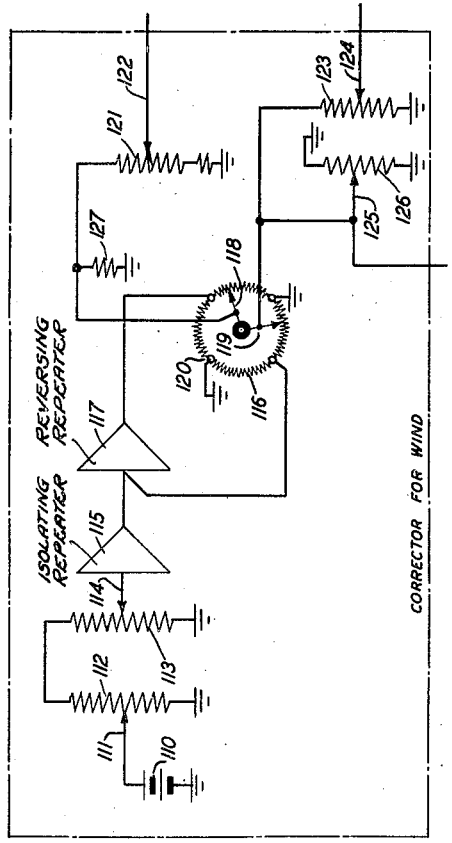
Fig. 5 is a schematic representation of the corrector for wind.

Figs. 10, 10A, 10B, 10C, 10D disclose repeaters forming part of the director;

Fig. 11 diagrammatically shows the azimuth angle servo-motor and potentiometers;

Fig. 12 diagrammatically shows the fuse servo-motor and potentiometer;

Fig. 13 diagrammatically shows the time of flight servo-motor and potentiometers;

Fig. 14 diagrammatically shows the elevation angle servo-motor and potentiometers;

Fig. 15 shows the resistance variations of the special time of flight and elevation angle potentiometers;

Fig. 16 diagrammatically shows the observing mechanism.

The geometric factors involved in directing a shell from a gun to a moving target, using a system of rectangular coordinates, are illustrated in Fig. 1. For convenience in expressing azimuthal angles as bearings, the $y$ axis is assumed to be north, though, if desired, any other axis may be used. Assume a vertical plane through the target and director, having an azimuthal angle $\alpha$. The coordinates of the present position of the projection of the target are $x, y$, and the horizontal from the director to the vertical projection of the present position of the target is $h$. The vertical coordinate is $v$. The coordinates of the director with respect to the gun are $x_G, y_G, v_G$. The rates of change in the coordinates due to the motion of the target $\dot{x}, \dot{y}, \dot{v}$. The absolute changes in the coordinates during the time of flight $\Delta t$ are $\dot{x}\Delta t$, $\dot{y}\Delta t$ and $\dot{v}\Delta t$. The coordinates of the predicted position of the target with respect to the gun are $x_p = x + x_G + \dot{x}\Delta t$, $y_p = y + y_G + \dot{y}\Delta t$ and $v_p = v_G + \dot{v}\Delta t$, at an azimuthal angle or bearing $\alpha_p$ and an elevation angle $\epsilon_p$. The azimuthal angle $\alpha_p$ is corrected for drift and windage to give the azimuthal firing angle $\alpha_F$ not shown. The elevation angle $\epsilon_p$ is corrected for windage, muzzle velocity, air density and superelevation to give the quadrant angle $\epsilon_F$.

In Fig. 2 current from a grounded battery 1, or other suitable source, is supplied to the winding of a potentiometer 2. The slant range from the director to the target is continuously measured by some known means, such as an optical or radio range finder, or an optical, radio or sonic triangulation system. The magnitude of the slant range is displayed to the range setter, either directly, or by means of a meter, or other indicator, and the range setter continuously moves the wiper 3 of the potentiometer 2 to agree with the range readings. If desired, the indicator of the range finding device may be associated with a servo-motor system which continuously directly moves the wiper 3. The resistance of the winding 2 is of the proper value so that voltages selected by the wiper 3 will have the proper scale relationship to the range readings. The winding 2 will normally have a variation of resistance per unit length which is linear, but, may be empirically shaped for use with a particular range finder to obtain a more advantageous scale distribution.

The positive voltage, selected by the wiper 3, is supplied to a thermionic repeater 4, of the type shown in Fig. 10, which reverses the polarity of the voltage and is a unilateral device acting as an isolator to prevent any changes in impedance due to the remainder of the circuit from affecting the accuracy of the voltages selected by the wiper 3.

The negative voltage from the output of the repeater 4 is supplied to a similar repeater 5, which reverses the polarity of the applied voltage.

The wipers 6, 7, 8 are insulated from each other and from their support, and are rotated by an elevation tracking telescope 250, Fig. 16, mounted on shaft 251 in accordance with the angle of elevation or depression of the target. The wipers 6, 7, 8 associated with potentiometers 9, 10 and 11 respectively may be directly rotated by the shaft of the tracking telescope 250, or by some intermediary such as gearing 252, 253, a mechanical linkage, or a servo-motor system.

The elevation of the target above a horizontal plane at the director cannot exceed a right angle, and the depression of the target below this plane is only a fraction of a right angle, thus the windings of the potentiometers 9, 10, 11 need only be equivalent to an angle which has a maximum value somewhat larger than a right angle. The portion of the winding from junction 12 to ground corresponds to a right angle, or quadrant, and the portion from 12 to 13 to the excess over a right angle.

The current due to the positive potential from the output of repeater 5 flows from the junction 12 through the windings 9, 10 to ground, thence back to repeater 5. For convenience of illustration, to reduce the complexity of the drawings, circuits have been shown by single lines. When not otherwise shown, the return circuits are through the ground. As shown in Fig. 10 one input and one output lead of each repeater are grounded, so that the return circuits to the repeaters are through the ground.

The potentiometer winding 9, between the junction 12 and ground, has a resistance per unit length varying as a sinusoidal function per unit angle. As a positive voltage is applied to this winding, the voltage drop along the winding will correspond with the variation in a cosinusoidal function in the first quadrant. The winding 10 has a resistance per unit length varying with a cosinusoidal function per unit angle. As a positive voltage is applied to this winding, the voltage drop along the winding will correspond with the variations in a positive sinusoidal function in the first quadrant. Assume that zero angle for the wiper 6 is at the junction 12, that zero angle for the wiper 7 is at ground, and that the wipers 6, 7 rotate counter-clockwise for increasing angle. The voltage between the wiper 7 and ground will then vary as a positive sinusoidal function, and the voltage between the wiper 6, which leads the wiper 7 by one right angle, and is thus in quadrature, will vary as a positive cosinusoidal function.

For an angle less than zero, that is, an angle of depression, or an angle in the fourth quadrant, the cosinusoidal function is still positive, thus the current due to the positive potential from the output of the repeater 5 also flows from junction 12 to 13, thence through resistor 14, and the excess of winding 11 to ground.

For an angle less than zero, that is, in the fourth quadrant, the sinusoidal function is negative, thus current due to the negative potential from the output of repeater 4 flows through resistor 15 and the excess of winding 10 to ground.

Current due to the negative potential from the output of repeater 4 also flows in the winding 11. The winding 11 has a resistance per unit length varying as a cosinusoidal function per unit angle. Thus the potential between wiper 8 and ground in the first quadrant varies as a negative sinusoidal function, and, due to the current from repeater 5 flowing in the excess of winding 11, in the fourth quadrant as a positive sinusoidal function.

The excesses of windings 10, 11 over a right angle, corresponding to angles of depression, vary in resistance per unit length with a cosinusoidal function per unit angle, the excess of winding 9 over a right angle varies in resistance per unit length with a sinusoidal function.

As the potentials from the repeaters 4 and 5 are proportional to the slant range from the director to the target, and the wipers 6, 7, 8 are moved through the angle of elevation to the target, the voltage between wiper 6 and ground will be proportional to the slant range times the cosine of the angle of elevation, that is, the horizontal distance in plane of the director to the projection of the target; the voltage between wiper 7 and ground will be proportional to the slant range times the sine of the angle of elevation, that is, the vertical distance above the plane of the director to the target; and the voltage between wiper 8 and ground will be proportional to the negative value of the vertical distance.

The resistors 14, 15 adjust the currents flowing in the portions of the potentiometers 9, 10, 11 exceeding a right angle to the same value as the currents flowing in the windings for a right angle, so that the scale of the voltage differences between the wiper 6, 7, 8 and ground will be correct for all angles of elevation or depression.

The positive voltage between the wiper 6 and ground, proportional to the horizontal distance in the plane of the director from the director to the projection of the target is supplied to a repeater 16, which reverses the polarity, and to a repeater 17, which again reverses the polarity. The repeater 16 prevents any impedance changes in the remainder of the circuit from affecting the accuracy of the voltages selected by the wiper 9. The construction and operation of the repeaters 16, 17 are described in detail in connection with Fig. 10.

The potentiometer winding 18 has a resistance per unit length varying with a complete cosinusoidal function per unit angle extending over all four quadrants. As a sinusoidal function is positive in the first and second quadrants, current due to the positive potential in the output of the repeater 17 is supplied to the junction 19 and flows through both upper portions of the winding 18 to ground. As a sinusoidal function is negative in the third and fourth quadrants, current due to the negative potential in the output of the repeater 16 is supplied to the junction 20 and flows through the lower portions of the winding 18 to ground.

The wipers 21, 22, 23, 24 are supported by the pedestal 256, Fig. 16, but are insulated from the pedestal 256 and from each other. The winding 18 is mounted in the tracking head 255 which is supported on the base 257. The head 255 is rotated to keep the azimuth tracking telescope 254 on the target. The wipers 6, 7, 8, 21, 22, 23, 24 and windings 9, 10, 11, 18 are connected through brushes and slip rings to cables connected to the computer circuits. For convenience in describing the circuit, the wipers 21, 22, 23, 24 will be considered as rotating with respect to winding 18. For convenience, the reference azimuth may be north and south, though other values may be used. The wipers may rotate counter-clockwise, for increasing angle. The zero angle will then be at the right-hand ground, the first quadrant in the upper right, the second quadrant in the upper left, the third quadrant in the lower left, and the fourth quadrant in the lower right.

The voltage between wiper 21 and ground will be proportional to the horizontal distance from the director to the projection of the target times the positive sine of the angle of azimuth, that is, to the $x$ coordinate of the rectangular coordinates of the position of the target. The voltage between the wiper 22 and ground will be the negative of the $x$ coordinate. The wiper 23 leads the wiper 21 by a right angle, thus, the voltage between the wiper 23 and ground will be proportional to the horizontal distance from the director to the vertical projection of the target times the positive cosine of the angle of azimuth, that is, to the $y$ coordinate; while the voltage between the wiper 24 and ground is the negative of the $y$ coordinate.

Thus, the connections 25, 26, 27, respectively, have potentials with respect to ground proportional to the rectangular coordinates $x, y, v$ of the target with respect to the horizontal plane through the director.

The rectangular coordinates of the target with respect to the gun are equal to the rectangular coordinates of the target with respect to the director plus the rectangular coordinates of the director with respect to the gun. The latter coordinates may be positive or negative. A battery 28, with an intermediate point grounded is connected to the terminals of a single pole double-throw switch 29, which applies a potential of appropriate polarity to the winding of the potentiometer 30. The wiper of the potentiometer 30 is adjusted to select a potential with respect to ground proporional to the rectangular coordinate $x_G$ of the director with respect to the gun. This potential is added to the potential of the connection 25 in the repeater 31 to produce a potential proportional to the rectangular coordinate $x+x_G$ of the present position of the target with respect to the gun.

The rectangular coordinates of the predicted position of the target will be equal to the rectangular coordinates of the present position of the target plus an increase in each coordinate equal to the rate of change in that coordinate multiplied by the time of flight of the shell. The time of flight of the shell is, as yet, indeterminate, but, as explained hereinafter, is manifested as an angular rotation of the shaft of the motor 32, Fig. 3.

The potential, proportional to the negative $x$ coordinate, between the wiper 22 and ground is applied through a data smoothing network 33 to the differentiating repeater 34. As described in connection with Fig. 10, the repeater 34 produces an output potential proportional to the differential, time derivative, or rate of change in the input potential and of opposite, or positive polarity.

The output of the repeater 34 should accurately represent the rate of change in the $x$ coordinate due to the speed of the target. But, the tracking telescopes rarely follow the target exactly, the operators tending to overrun, then underrun, the target, and such tracking will tend to produce a fluctuation in output of the repeater 34. To minimize this effect, the data smoothing network 33 reduces these undesirable unsystematic variations.

The potential in the output of the repeater 34 causes a current proportional to the rate of change $\dot{x}$ in the $x$ coordinate to flow in the winding of the potentiometer 35. The potentiometer 35 has a linear variation of resistance per unit length, to give the proper scale to the voltage drop down the winding of potentiometer 35.

The wiper of the potentiometer 35 as explained hereinafter is moved by the shaft of the motor 32, Figs. 3 and 13, a distance proportional to the time of flight of the shell, thus, the voltage selected by the wiper of the potentiometer 35 is proportional to the rate of change $\dot{x}$ of the $x$ coordinate multiplied by the time of flight $\Delta t$ of the shell, that is, the absolute change $\dot{x}\Delta t$ in the coordinate from the present position to the predicted position of the target.

The repeater 31, as explained in connection with Fig. 10, adds up the voltage from the wiper 21 proportional to the $x$ coordinate from the target to the director, the voltage from potentiometer 30 proportional to the $x$ coordinate from the director to the gun $x_G$, and the voltage from the potentiometer 35 proportional to the change $\dot{x}\Delta t$ in the $x$ coordinate from the present to the predicted position of the target to produce a negative voltage $x+x_G+\dot{x}\Delta t$ proportional to the $x_p$ coordinate from the gun to the predicted position of the target. In a similar manner, the voltage from the wiper 23 proportional to the $y$ coordinate is combined with similar voltages in the repeater 36 to produce in the output of the repeater 36 a negative voltage proportional to the $y_p$ coordinate from the gun to the predicted position of the target.

The $x_p$ and $y_p$ coordinates are two sides of a right triangle, having as hypotenuse $h_p$, the horizontal distance from the gun to the projection of the predicted position of the target, and an angle, $\alpha_p$, the azimuthal angle from the $y_p$ axis. It may be shown that, $$x_p \cos \alpha_p - y_p \sin \alpha_p = 0 \quad (1)$$

and $$x_p \sin \alpha_p + y_p \cos \alpha_p = h_p \quad (2)$$

In the expression $x_p \cos \alpha_p - y_p \sin \alpha_p = 0$, the rectangular coordinates $x_p$ and $y_p$ have, in effect, been resolved into a component normal or lateral to the plane of departure containing the direction of the gun. This form of solution has the advantage that corrections, such as drift, windage, etc. which may be resolved into lateral components, may be algebraically added directly to the other factors in the equation before solving the equation for $\alpha_F$. In the expression $$x_p \sin \alpha_p + y_p \cos \alpha_p = h_p$$

the rectangular coordinates $x_p$ and $y_p$ have, in effect, been resolved into horizontal components in line with the direction from the gun to the projection of the target. This form of solution has the advantage that in-line corrections, such as muzzle velocity, air density, range wind, etc. may be algebraically added to the other factors in the equation before solving the equation for $h_p$.

The winding of the potentiometer 37 has a resistance per unit length varying with a complete sinusoidal function per unit angle extending over all four quadrants. The points in the winding 37 where the function passes through zero are grounded. The negative voltage proportional to $x_p$ from the output of the repeater 31 is applied to the lower central point of the winding 37. The negative voltage from the output of the repeater 31 is reversed by the repeater 38 and applied to the upper central point of the winding 37.

Similarly, the potentiometer winding 39 varies in resistance per unit length as a complete sinusoidal function per unit angle. The negative voltage proportional to $y_p$ from the output of the repeater 36 is applied to the lower central point of the winding 39. The negative voltage from the output of the repeater 36 is reversed in polarity by the repeater 40 and applied to the upper central point of the winding 39.

The wipers 41, 42, 43, 44 are moved by the shaft of the servo-motor 45, Figs. 3 and 11, and are insulated from each other and from the shaft.

If zero angle is at the point 46, and the wipers rotate counter-clockwise for increasing angle, the voltage with respect to ground, of the wiper 41 will vary as the positive sine of $\alpha_p$; of wiper 42 as the positive cosine of $\alpha_p$; of the wiper 43 as the negative sine of $\alpha_p$; and of the wiper 44 as the positive cosine of $\alpha_p$.

The voltage with respect to ground selected by the wiper 42 which varies as $x_p \cos \alpha_p$ is supplied over wire 47 to repeater 48; and that selected by the wiper 43 which varies as $-y_p \sin \alpha_p$, is supplied over wire 49 to repeater 48.

As explained hereinafter, a voltage proportional to the correction for drift is produced by the network 50, and a voltage proportional to the component of the wind is produced by the network 51, and these voltages, are supplied over wires 52, 53 to the repeater 48.

The motor 45 may be of any desired type, but, for the purpose of illustration, is shown as a two-phase motor. Alternating current from the source 55 is supplied through a phase shifting network 56, having a phase shift of 90 degrees, to a power amplifier 57 thence to one winding of the motor 45. Current direct from the source 55 is supplied through a modulating network 58, to a power amplifier 99 thence to the second winding of the motor 45. The current from the output of the repeater 48 controls the modulating network 58 of the type disclosed in United States Patent 2,025,158, December 24, 1935, F. A. Cowan, to supply current of the proper phase and amplitude to the second winding of the motor 45.

Equation 1, as modified for drift and wind, may be written $D+W+x_p \cos \alpha_F - y_p \sin \alpha_F = 0$. The motor 45 continuously rotates the wipers 42, 43 till the current from the repeater 48 is reduced to zero. The shaft of the motor 45 will then have turned through the angle $\alpha_F$, and this angle may be indicated or transmitted by any desired means to the gun.

The voltage of the wiper 41 with respect to ground is proportional to $x_p \sin \alpha_p$; the voltage of the wiper 44 with respect to ground is proportional to $y_p \cos \alpha_p$; thus, from Equation 2, the sum of these voltages will be a voltage proportional to $h_p$. The voltages from wipers 41 and 44 are applied to, and summed up by the repeater 98.

The value of $h_p$ derived from the sum of $x_p \sin \alpha_p$ and $y_p \cos \alpha_p$ will be a geometric value, and will be correct only for a gun of standard muzzle velocity fired through air of standard density in the absence of wind. As explained hereinafter, corrective voltages are derived from the circuits 51, 59, 60 proportional to the deviation of the windage, muzzle velocity and air density from standard; and these corrective voltages are also applied to the repeater 98, to form, with the voltages proportional to $x_p \sin \alpha_p$ and $y_p \cos \alpha_p$, in the output of the repeater 98 a voltage proportional to $-h_t$, the horizontal distance from the gun to the projection of the target, corrected for firing.

In a manner similar to that explained hereinabove in connection with the $x$ coordinate, the voltage of the wiper 7 with respect to ground; the voltage of the wiper 61 with respect to ground, which is proportional to the vertical coordinate from the director to the gun; and the voltage of the wiper 62 with respect to ground, which is proportional to the change in the vertical component of the target with respect to the director during the flight of the shell, are added in the repeater 63 to give a voltage proportional to the geometric value of the projection from the target to the plane of the gun. As explained above in connection with the $h_p$ coordinate, the $v_p$ coordinate is combined with corrective voltages from the networks 51, 59, 60 to produce a voltage in the output of the repeater 63 proportional to the negative value $-v_t$ of the corrected projection.

Owing to the trajectory of the shell, the gun must be elevated above the corrected geometric vertical location of the target. As explained hereinafter, a voltage proportional to superelevation of the gun is produced by the network 64 and is applied to the repeater 65, where it is combined with the voltage from the repeater 63. The output of the repeater 65 will be a voltage proportional to the positive vertical coordinate $+v_F$ from the gun to the fictitious superelevated position of the target.

As $h_F$ and $v_F$ are voltages proportional to two sides of a right triangle, of which the equadrant angle of the gun is one angle, Equation 1 may be applied in the form $h_F \sin \epsilon_F - v_F \cos \epsilon_F = 0$.

As explained hereinabove in connection with the potentiometer winding 9, the angle of elevation of the gun will cover the quadrant from the horizontal to the vertical, with a small angle of depression below the horizontal. The potentiometer winding 67 has a resistance per unit length varying with a sinusoidal function per unit angle extending over one complete quadrant, and a portion in excess of a quadrant also varying in resistance with the same function. Winding 66 has a resistance per unit length varying with a cosinusoidal function extending over one quadrant and a portion in excess of a quadrant.

The negative voltage proportional to $h_F$ from the output of the repeater 98 is reversed in polarity by the repeater 70 and applied to the full quadrant of the winding 66. The negative voltage from the output of the repeater 98 is applied through resistor 71 to the excess portion of the winding 66. The wiper 72 is moved by the shaft of the motor 73 as shown in Fig. 14. With zero angle at the ground point or horizontal and counter-clockwise rotation for increasing angle, the voltage with respect to ground of the wiper 72 will be proportional to $h_F \sin \epsilon_F$.

The positive voltage proportional to $v_F$ from the output of the repeater 65 is reversed in polarity by the repeater 74 and applied to the full quadrant of the winding 67. As the angles of elevation and depression are in the first and fourth quadrants, in which the cosine function has the same sign, the negative voltage from the output of the repeater 74 is also applied to the excess portion of the winding 67, and the resistors 75, 76. The wiper 77 is also moved by the motor 73, and, as this wiper lags 90 degrees behind the wiper 72, thus having a cosinusoidal variation, the voltage selected by wiper 77 with respect to ground will be proportional to minus $v_F \cos \epsilon_F$.

The voltages proportional to plus $h_F \sin \epsilon_F$ and minus $v_F \cos \epsilon_F$ are added in the repeater 78 and supplied to the modulator 79. The modulator 79 operates, like the modulator 58, to control the magnitude and phase of the current supplied to one winding of the motor 73. The motor 73 rotates the wipers 72, 77 until the voltage from the repeater 78 is reduced to zero. The position of the shaft of the motor 73 then indicates the quadrant angle to be transmitted to the gun.

The potentiometer windings 66, 67 only cover somewhat more than one electrical right angle. These windings 66, 67 and the windings of the other potentiometers described, may conveniently be in the form of a close helix of resistance wire wound on a flat insulating strip of the desired contour. The flat strips may be bent into arcs of circles about the center of rotation of the wipers, and held on a suitable base. In the case of windings, such as windings 66, 67, which represent less than an electrical full revolution, the winding may be made to fill substantially the full circumference of the circle about the center of rotation of the wipers, and the wipers, such as wipers 72, 77 driven by the shaft of the motor through a speed changing mechanism, such as a train of gears.

At the instant of firing, the shell starts off in the direction of the fictitious superelevated position of the target, and gradually diverges from this course along the curve of the trajectory to eventually reach the predicted position of the target. The length of the path along the trajectory is related to, but not necessarily equal to, the slant distance from the gun to the superelevated position of the target, and, as the velocity of the shell is continually diminishing, the time of flight will be related to, but not linearly equal to, the length of the trajectory.

The gun is pointed to a firing target elevated by the amount of the superelevation vertically above the virtual target. The coordinates of the firing target are $h_F$ and $v_F$, thus, the slant range $r_F$ to this target will be $r_F = h_F \cos \epsilon_F + v_F \sin \epsilon_F$. The time of flight, $\Delta t$, of the shell, for constant velocity, would, to a first approximation, be proportional to $r_F$. But, the velocity of the shell is continuously decreasing thus this approximate value of $\Delta t$ must be increased, to make $\Delta t = h_F \cos \epsilon_F + v_F \sin \epsilon_F + h_F f_6(\Delta t) + v_F f_7(\Delta t)$. A more accurate match may be obtained if $\cos \epsilon_F$ and $\sin \epsilon_F$ are multiplied by a function $f(\epsilon_F)$ which is at all times nearly unity, to give the functions $$f_4(\epsilon_F) = f(\epsilon_F) \cos \epsilon_F$$

and $f_5(\epsilon_F) = f(\epsilon_F) \sin \epsilon_F$, and $\Delta t$ is replaced by a function $f_3(\Delta t)$ to convert the distance $r_F$ into time units. The equation then is $$f_3(\Delta t) = h_F f_4(\epsilon_F) + v_F f_5(\epsilon_F) + h_F f_6(\Delta t) + v_F f_7(\Delta t)$$

The functions $f_4(\epsilon_F)$ and $f_5(\epsilon_F)$ are shown in Figs. 15N and 15O, plotted against $\epsilon_F$ in mills. The card of potentiometer 68 is shaped to give the resistance function $f_4(\epsilon_F)$, and the card of potentiometer 69 is shaped to give the resistance function $f_5(\epsilon_F)$.

Current of positive polarity proportional to $+v_F$ flows from the output of the repeater 65 through two sections of the potentiometer winding 69 and resistor 76 to ground. The voltage with respect to ground of the wiper 80 will be proportional to $+v_F f(\epsilon_F) \sin \epsilon_F$. Current of positive polarity proportional to $+h_F$ from the output of repeater 70 flows through the full quadrant of the potentiometer winding 68 to ground, and through the excess of the winding 68 and resistor 81 to ground. The voltage with respect to ground of the wiper 82 will be proportional to $$+h_F f(\epsilon_F) \cos \epsilon_F$$

The sum of the voltages $+v_F f(\epsilon_F) \sin \epsilon_F$ and $+h_F f(\epsilon_F) \cos \epsilon_F$ is approximately, but not exactly, proportional to time of flight of the shell. It is, therefore, necessary to make two other small corrections. The terms $h_F f_6(\Delta t)$ and $v_F f_7(\Delta t)$ may be used in the form $h_F f_8(\Delta t) + (av_F - bh_F) f_9(\Delta t)$, where $a$ and $b$ are the relative magnitudes of the $v_F$ and $h_F$ voltages. The cards of potentiometers 86, 84 are respectively shaped to give the resistance functions $f_8(\Delta t)$ and $f_9(\Delta t)$, as shown in Figs. 15B and 15A, plotted against time of flight ($\Delta t$) in seconds. Current of negative polarity proportional to $-h_F$ flows from the output of the repeater 98, through resistor 83 and potentiometer winding 84 to ground. Current of positive polarity proportional to $+v_F$ flows from the output of repeater 65 through resistor 85 and potentiometer winding 84 to ground. The resistors 83 and 85 adjust the relative magnitudes of these two currents. Current of positive polarity proportional to $+h_F$ flows from the output of repeater 70 through resistor 95 and potentiometer winding 86 to ground. Current from a suitable source 87 flows through potentiometer winding 88 to ground. The card of winding 88 is shaped to give the resistance function $f_3(\Delta t)$ shown in Fig. 15C, plotted against time of flight ($\Delta t$) in seconds. The voltages with respect to ground of the wipers 80, 82, 89, 90, 91 are supplied to a repeater 92 and added to produce a voltage of the required form $-f_3(\Delta t) + h_F f(\epsilon_F) \cos \epsilon_F + v_F f(\epsilon_F) \sin \epsilon_F + h_F f_8(\Delta t) + (av_F - bh_F) f_9(\Delta t) = 0$. This voltage is supplied to the modulator 93 and controls the motor 32. The wipers 89, 90, 91 are moved by the shaft of the motor 32 to make the voltage in the output of the repeater 92 equal zero, in which case, the position of the shaft of the motor 32 indicates the corrected time of flight of the shell.

Drift correction

Figure 4:
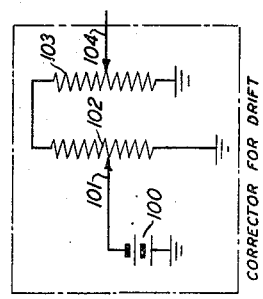
Fig. 4 is a schematic representation of the corrector for drift.

The network 50 is shown in detail in Fig. 4. The drift, or lateral deflection of a shell, is due to the spin, or rotation, of the shell in the air during the time of flight. The absolute value of this lateral deflection for various angles of elevation and for various times of flight are determined by tests of the gun, based upon theoretical considerations. Analysis of these test results shows that the drift varies, in an empirical fashion, with the quadrant angle of the gun and with the time of flight of the shell. The drift thus may be represented by a voltage $e_d = f_1(\epsilon_F) \cdot f_2(\Delta t)$.

Current from a suitable source 100 flows to wiper 101, thence through the lower part of winding 102 and ground back to battery 100, and through the upper part of winding 102, winding 103 and ground back to the battery 100.

The lower part of the winding 102 acts effectively as a source of potential for the winding 103. As shown in United States Patent 1,858,364, May 17, 1932, W. Koenig, Jr., the connection of the potentiometer windings 102 and 103 back to back minimizes the impedance changes due to the movements of the wipers 101, 104. The cards of the windings 102, 103 are respectively shaped to produce the resistance functions $f_1(\epsilon_F)$ and $f_2(\Delta t)$ shown in Figs. 15P and 15D.

The wiper 101 is moved by the shaft of the motor 73, Figs. 3 and 14, a distance proportional to the quadrant angle of the gun, while the wiper 104 is moved by the shaft of the motor 32, Figs. 3 and 13, a distance proportional to the time of flight of the shell. The wiper 104 will then have a negative potential with respect to ground proportional to the required correction for drift.

Windage correction

The network 51 is shown in detail in Fig. 5. Current from the positive terminal of a suitable source 110 flows through the wiper 111 to the winding 112, thence through the lower portion of the winding 112 and ground to battery 110, also through the upper portion of the winding 112, through winding 113 and ground to battery 110.

A shell, in traveling from the gun to the target, will often rise to a considerable height and pass through stratas of the atmosphere having wind currents of various magnitudes and directions. Usually, the actual wind currents are averaged into a fictitious wind, and the magnitude and direction of this wind are communicated at intervals to the operators of the director.

The wiper 111 is adjusted to a position proportional to the magnitude of this fictitious wind.

This wind may be resolved into a lateral component or cross wind at right angles to the line of flight of the shell and an on-line component, a head or rear wind in the line of flight of the shell. From a study of the tabulated corrections for the effect of the wind, it is found that the correction for cross wind is of the form $f_{24}(\Delta t) f_{21}(\epsilon_F)$, and for the on-line wind, a correction in horizontal range of the form $f_{25}(\Delta t) \cdot f_{22}(\epsilon_F)$, and a correction in vertical height of the form $f_{26}(\Delta t) \cdot f_{23}(\epsilon_F)$, where $\Delta t$ is the time of flight of the shell and $\epsilon_F$ is the quadrant angle of the gun. The corrections $f_{24}(\Delta t)$, $f_{25}(\Delta t)$, and $f_{26}(\Delta t)$ were found for the particular gun considered to be very nearly the same, thus one correction $f_{20}(\Delta t)$ varying with $\Delta t$ could be applied to the cross wind and the horizontal and vertical corrections for on-line wind. The corrections for $f_{21}(\epsilon_F)$, $f_{22}(\epsilon_F)$ and $f_{23}(\epsilon_F)$ are usually quite different and thus should be independently determined.

The winding 113 has a resistance varying with the resistance function $f_{20}(\Delta t)$, shown in Fig. 15E, plotted against the time of flight ($\Delta t$) in seconds, and the wiper 114 is moved by the shaft of the motor 32, Figs. 3 and 13, a distance proportional to the time of flight of the shell. The positive potential with respect to ground of the wiper 114 is applied to a repeater 115 which reverses the polarity and, being a unilateral device, acts as an isolating element to prevent changes in impedance of the remainder of the circuit from affecting the accuracy of the voltage selected by wiper 114.

The potentiometer winding 116 varies in resistance per unit length with a sinusoidal function per unit angle extending over four quadrants. The diametrically opposite points where the function is zero are grounded. The negative voltage from the output of the repeater 115 is applied to the lower central point of the winding 116. The negative voltage from the output of the repeater 115 is reversed in polarity by the repeater 117 and applied to the upper central point of the winding 116. The wipers 118 and 119 are driven by the shaft of the motor 45, Figs. 3 and 11, a distance proportional to the azimuthal angle, and are insulated from the shaft and from each other. If zero angle be at the point 120 and the wipers 118, 119 rotate in a clockwise direction for increasing angle, the potential of the wiper 118 will vary proportionally to the component of the magnitude of the wind times the positive sine of the angle of rotation; and the potential of the wiper 119 will vary as the same wind component times the positive cosine of the angle of rotation.

If the origin of the $y$ coordinates be assumed to be north, then the azimuthal angle of the gun will be a bearing. The direction of the wind is also usually expressed as a bearing, but, the bearing of the gun will rarely coincide with the bearing of the wind. To allow for this difference in bearing, the potentiometer winding 116 may be rotated with respect to the wipers 118, 119 through an angle equal to the bearing of the wind, or, the wipers 118, 119 may be driven by the shaft of the motor 45 through differential gearing 259, Fig. 11, and the casing of the gearing rotated through an angle proportional to the bearing of the ballistic wind so that the angle turned by the wipers 118, 119 from the zero angle is equal to the algebraic sum of the bearing angle of the wind and the bearing angle of the gun.

The effect of the lateral component of the wind upon the azimuthal angle of the gun is found to depend upon the quadrant angle of the gun. The voltage with respect to ground of the wiper 118 causes a current to flow through the potentiometer winding 121 to ground. The potentiometer winding 121 has a resistance which is the required function $f_{21}(\epsilon_F)$, shown in Fig. 15Q, of the quadrant angle determined from the tables for the particular gun. The wiper 122 is moved by the shaft of the motor 73, Figs. 3 and 14, and the voltage selected by the wiper 122 is applied to the repeater 48, Fig. 2.

The effect of the on-line component of the wind upon the geometric horizontal and vertical coordinates of the target with respect to the gun will vary with the appropriate function of the quadrant angle. The voltage with respect to ground of the wiper 119 causes a current to flow through the potentiometer winding 123 to ground. The potentiometer winding 123 has a resistance which is the required function $f_{22}(\epsilon_F)$, shown in Fig. 15R, of the quadrant angle determined from the tables for the particular gun. The wiper 124 is moved by the shaft of the motor 73, Figs. 3 and 14, and the voltage selected by the wiper 124 is applied to the repeater 98, Fig. 3.

The voltage with respect to ground of the wiper 119 causes a current to flow through wiper 125, through both portions of the potentiometer winding 126 to ground. The required correction to the vertical coordinate of the target with respect to the gun is found from the tables to be a function varying with the quadrant angle which rises from zero at one end to a maximum at the center and falls to zero at the other end. The wiper 125 is moved by the shaft of the motor 73, Figs. 3 and 14, and the voltage selected by the wiper 125 is applied to the repeater 63, Fig. 2. The potentiometer winding 126 has a resistance which is the required function $f_{23}(\epsilon_F)$, shown in Fig. 15S, of the quadrant angle determined by the tables for the particular gun and, owing to the novel connection of the potentiometer winding 126, the voltage with respect to ground of the wiper 125 has the desired variation.

The wipers 118, 119 are both in contact with the same winding 116, and the loads on these wipers preferably should be equal. To equalize these loads, a resistor 127, serving as a dummy potentiometer winding may be connected in parallel relationship with the winding 121.

*Muzzle velocity*

Figure 6:
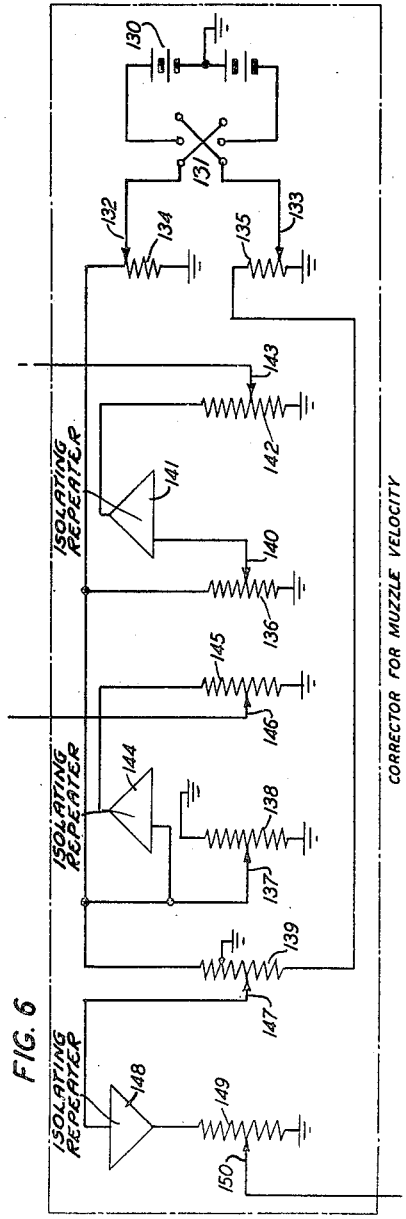
Fig. 6 is a schematic representation of the corrector for muzzle velocity.

The network 59, Fig. 1, for correcting for muzzle velocity is shown in detail in Fig. 6.

The tables for any given type of gun are based upon the assumption of a certain average value of muzzle velocity. The actual muzzle velocity of a particular gun may be larger or smaller than the assumed value. Thus, the required correction effectively may be positive or negative. A suitable source of voltage 130 has an intermediate point grounded, and the positive and negative poles connected to a double-pole, double-throw switch 131, so that balanced voltages of either polarity may be applied, through the wipers 132, 133 to the windings 134, 135 of a balanced potentiometer. The wipers 132, 133 are preferably mechanically interlinked and simultaneously adjusted to the value of muzzle velocity for the particular gun.

A variation of the muzzle velocity from the assumed value will not materially affect the shell laterally, but will affect the horizontal and vertical coordinates of the path of the shell.

The corrections to the horizontal and vertical coordinates due to a difference between the actual and assumed muzzle velocities of the gun will depend upon the time during which the shell is under the influence of the muzzle velocity, that is, the time of flight $\Delta t$, and on the quadrant angle $\epsilon$ of the gun. The exact relationship is usually a more or less complicated function or functions of the time of flight and the quadrant angle based upon empirical tests and expressed in the tables for the gun. The horizontal correction may be expressed as $MV[f_{10}(\Delta t) \cdot f_{11}(\epsilon_F) + f_{12}(\Delta t) \cdot f_{13}(\epsilon_F)]$, and the vertical correction as $$MV[f_{14}(\Delta t) \cdot f_{15}(\epsilon_F)]$$

Current from the source 130 flows through the switch 131, wiper 132, lower portion of winding 134 to ground, and, through upper portion of winding 134 potentiometer winding 136 to ground; wiper 137 and both portions of potentiometer winding 138 to ground; and upper portion of potentiometer winding 139 to ground. Current from the source 130 also flows through the switch 131, wiper 133, lower portion of winding 135 to ground; and through lower portion of potentiometer winding 139 to ground.

The potentiometer winding 136 has a resistance varying with the factor $f_{12}(\Delta t)$, shown in Fig. 15G, in the required function depending upon the time of flight. The wiper 140 is moved by the shaft of the motor 32, Figs. 3 and 13, a distance proportional to the time of flight. The voltage with respect to ground of the wiper 140 is applied to the repeater 141. The repeater 141 reverses the polarity of the voltage and serves to prevent impedance changes due to the remainder of the circuit from affecting the voltage selected by the wiper 140. The voltage from the output of the repeater 141 causes a current to flow in the potentiometer winding 142 which has a resistance varying with the function $f_{13}(\epsilon_F)$, shown in Fig. 15V, depending upon the quadrant angle. The wiper 143 is moved by the shaft of the motor 73, Figs. 3 and 14, a distance proportional to the quadrant angle. The voltage with respect to ground of the wiper 143 is applied to the repeater 98, Fig. 3.

For the smaller guns of limited range, the single correction by the potentiometers 136, 142 may be sufficiently accurate.

For the larger guns, particularly long range guns, the required function has such wide variations that it is impractical to wind a single potentiometer card to cover the whole function. In such case, by known mathematical processes, the actual function may be divided into two related functions. The potentiometers 136, 142 will then have resistances varying with the values of one of the functions. The second function will often be of such form that the value of the correction for quadrant angle varies from zero at either end to a maximum at the middle, while the correction for time of flight varies with the time of flight. The wiper 137 is moved by the shaft of the motor 73, Figs. 3 and 14, in accordance with the quadrant angle, and selects a voltage with respect to ground which is zero at either end of the winding 138 and a maximum in the center. The potentiometer winding 138 has a resistance varying with the required function $f_{11}(\epsilon_F)$ shown in Fig. 15T.

The voltage on the wiper 137 is applied to the repeater 144, which reverses the polarity of the voltage, and causes a current to flow in the potentiometer winding 145. The repeater 144 prevents impedance changes in the remainder of the circuit from affecting the voltage selected by the wiper 137. The wiper 146 is moved by the motor 32, Figs. 3 and 13, a distance proportional to the time of flight of the shell. The potentiometer winding 145 has a resistance varying with the term $f_{10}(\Delta t)$, shown in Fig. 15M, of the function dependent upon the time of flight of the shell. The voltage with respect to ground of the wiper 146 is applied to the repeater 58, Fig. 2.

The resistance of the potentiometer winding 139 varies with the required correction $f_{15}(\epsilon_F)$, shown in Fig. 15U, in the vertical coordinate for quadrant angle. The wiper 147 is moved by the shaft of the motor 73, Figs. 3 and 14, to select a voltage of the proper value for the quadrant angle. The voltage with respect to ground of the wiper 147 is applied to a repeater 148. The repeater 148 reverses the polarity of the applied voltage, and prevents impedance changes due to the remainder of the circuit from affecting the voltage selected by the wiper 147. The voltage from the output of the repeater 148 causes a current to flow in the potentiometer winding 149 proportional to the voltage selected by the wiper 147. The resistance of the winding 149 varies with the term $f_{14}(\Delta t)$, shown in Fig. 15H, of the function dependent upon the time of flight of the shell. The wiper 150 is moved by the shaft of the motor 32, Figs. 3 and 13, a distance proportional to the time of flight. The voltage with respect to ground selected by the wiper 150 is applied to the repeater 63, Fig. 2.

*Air density*

Figure 7:
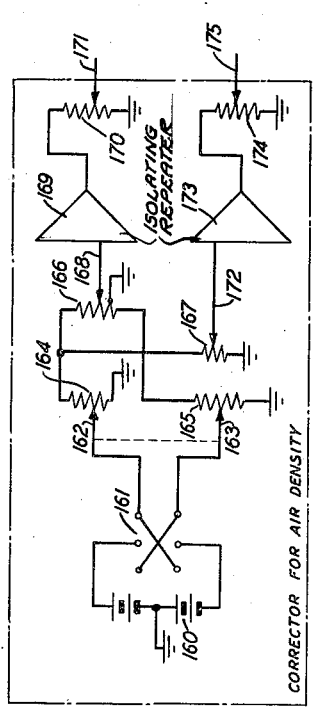
Fig. 7 is a schematic representation of the corrector for air density.

The circuit of the network 60, Fig. 2, is shown in detail in Fig. 7.

The tables for any given type of gun are based upon the assumption of a standard density of the air. The effect of a difference between the actual density and the assumed density is similar to the effect of a difference between the actual muzzle velocity and the assumed muzzle velocity. Such a difference will have little effect on the lateral flight of the shell but will affect the vertical and horizontal coordinates of the predicted position of the firing target. The horizontal correction may be expressed as $AD[f_{16}(\Delta t) \cdot f_{17}(\epsilon_F)]$ and the vertical correction as $AD[f_{18}(_A\Delta t) \cdot f_{19}(\epsilon_F)]$.

A suitable source of current 160, grounded at an intermediate point, has its terminals connected through a double-pole, double-throw switch 161 to the wipers 162, 163 in contact with the potentiometer windings 164, 165. Assuming the switch 161 is on the right side, current will flow from the source 160 through upper contacts of switch 161, wiper 162, through lower portion of potentiometer winding 164 and ground to the source 160; through upper portion of winding 164, upper portion of potentiometer winding 166 and ground to the source 160; through upper portion of winding 164, potentiometer winding 167 and ground to source 160. Current will also flow from source 160 through ground and lower portion of winding 165; and from ground through lower portion of winding 166, upper portion of winding 165; thence both currents flow through wiper 163, lower blade of switch 161 to source 160.

The wipers 162, 163 are preferably mechanically interlinked and simultaneously set for the deviation of the current value of the density of the air from standard. The windings 164, 165 have a resistance which will give a convenient spacing for the indications of values of density of the air. The switch 161 is operated to impress positive or negative values on the circuit, depending upon the value of the density, which may be more or less than the standard density.

The resistance of the potentiometer winding 166 varies with the term $f_{19}(\epsilon_F)$, shown in Fig. 15W, of the correction for the vertical coordinate which depends upon the quadrant angle. The wiper 168 is moved by the shaft of the motor 73, Figs. 3 and 14, a distance proportional to the quadrant angle. The voltage with respect to ground selected by the wiper 168 is applied to a repeater 169. The repeater 169 reverses the polarity of the applied voltage and causes a current to flow in the potentiometer winding 170. The repeater 169 also reduces the effect of the impedance changes due to the remainder of the circuit upon the accuracy of the voltage selected by the wiper 168. The winding 170 has a resistance varying with the term $f_{18}(\Delta t)$, shown in Fig. 15J, of the correction for the vertical coordinate which depends upon the time of flight of the sheel. The wiper 171 is moved by the shaft of the motor 32, Figs. 3 and 13, a distance proportional to the time of flight of the shell. The voltage with respect to ground of the wiper 171 is applied to the repeater 63, Fig. 2.

The winding 167 has a resistance varying with the term $f_{17}(\epsilon_F)$, shown in Fig. 15X, of the correction to the horizontal coordinate which depends upon the quadrant angle. The wiper 172 is moved by the shaft of the motor 73, Figs. 3 and 14, a distance proportional to the quadrant angle. The voltage with respect to ground of the wiper 172 is applied to the repeater 173. The repeater 173 reverses the polarity of the applied voltage and causes a current to flow in the potentiometer winding 174. The repeater 173 also reduces the effect of impedance changes due to the remainder of the circuit upon the accuracy of the voltage selected by the wiper 172. The winding 174 has a resistance varying with the term $f_{16}(\Delta t)$, shown in Fig. 15K, of the correction to the horizontal coordinate which depends upon the time of flight of the shell. The wiper 175 is moved by the shaft of the motor 32, Figs. 3 and 13, a distance proportional to the time of flight of the shell. The voltage with respect to ground of the wiper 175 is applied to the repeater 98, Fig. 3.

*Superelevation*

Figure 8:
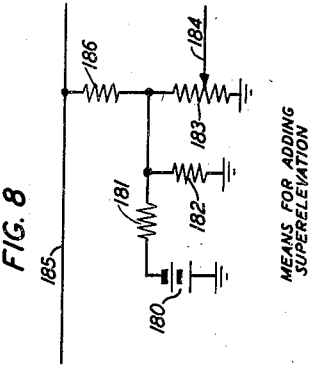
Fig. 8 is a schematic representation of a means for adding superelevation.

The network 64, Fig. 2, is shown in detail in Fig. 8.

Owing to the curvature of the trajectory of the shell, the gun must be elevated above the line from the gun to the predicted position of the target. The principal force tending to curve the trajectory is the force of gravity which produces a displacement proportional to the square of the time interval during which it acts on the shell. The empirical values of the superelevation given in the tables for a gun may be resolved into one component dependent only on the time of flight and another component dependent upon the vertical coordinate of the target modified by the time of flight of the shell. The correction for superelevation $v_B$ thus will have the form $v_B = \frac{1}{2}g(\Delta t)^2 [1+Kv_p]$, where $g$ is the acceleration due to gravity, and K is a constant determined from the values in the firing tables. Thus, $v_B = f(\Delta t)[1+Kv_p]$.

Current from a suitable source 180 flows through resistor 181 thence through resistor 182 and ground to the source 180; and through potentiometer winding 183 and ground to the source 180. The resistors 181, 182 act as a potential divider to apply the correct voltage from the source 180 to the winding 183, and may be replaced by a simple potentiometer. The voltage with respect to ground of the wiper 184 due to this current in the winding 183 will depend only on the time of flight of the shell.

The voltage from the output of the repeater 63, Fig. 2, causes a current proportional to the vertical coordindate of the position of the target to flow from the wire 185, through resistor 186, potentiometer winding 183 and ground back to repeater 63, Fig. 2. The voltage with respect to ground of the wiper 184 due to this current flowing in the winding 183 will depend upon the vertical coordinate $v_p$ of the position of the target. The resistance of the resistor 186 adjusts this current to the proper value with respect to the current from the source 180. The winding 183 has a resistance varying with the desired function $f(\Delta t)$, shown in Fig. 15L. The wiper 184 is moved by the shaft of the motor 32, Figs. 3 and 13, a distance proportional to the time of flight of the shell. The voltage with respect to ground of the wiper 184 is applied to the repeater 65, Fig. 3.

*Fuse setting*

The target is under continuous observation, and the data are being continuously supplied to the computer, thus, the shaft of the motor 32, Fig. 3, continuously indicates the time of flight of the shell if the gun were fired at the instant of observation. But, before the gun can be fired, a certain dead time is consumed in setting the fuse, loading and firing the gun. This dead time may be estimated for the particular gun crew. The circuit shown in Fig. 9 continuously receives what would be the time of flight of the shell, if the shell were fired at the given instant, and computes what the time of flight of the shell will be after the lapse of the dead time. The corrected time of flight is converted into fuse numbers, which are arbitrary numbers related to but not directly proportional to the time of flight of the shell.

Let $\Delta t_0 =$ the time of flight indicated by the motion of the shaft of motor 32, Fig. 3.
$\Delta t_1 =$ the corrected time of flight.
T = the dead time.
$Z_F =$ the fuse number corresponding to $\Delta t_1$, which is equal to $f(\Delta t_1)$.

Then $$\Delta t_1 = \Delta t_0 + \frac{d\Delta t_0}{dt} \cdot T + \frac{1}{2}\frac{d^2\Delta t_0}{dt^2} \cdot T^2$$

or $$\Delta t_0 + \frac{d\Delta t_0}{dt} \cdot T + \frac{1}{2}\frac{d^2\Delta t_0}{dt^2} \cdot T^2 - Z_F = 0$$

Current from a suitable source 190 flows through potentiometer winding 191 and ground to source 190. The winding 191 has a uniform variation of resistance per unit length. The wiper 192 is moved by the shaft of the motor 32, Figs. 3 and 13, a distance proportional to the time of flight of the shell. The voltage with respect to ground of the wiper 192 will then vary in accordance with $\Delta t_0$, the time of flight, and is applied by wire 193 directly to the repeater 194.

The voltage on the wire 193 is also applied to a repeater 195, shown in Fig. 10, which produces a voltage proportional to the rate of change, or time derivative, $$\frac{d\Delta t_0}{dt}$$

of the voltage.

The voltage from the output of the repeater 195 is applied to the winding of the potentiometer 196. The wiper 197 is set to one-half the estimated dead time T and thus selects a voltage proportional to $$\frac{1}{2}\frac{d\Delta t_0}{dt}T$$

This voltage is applied to the repeater 198 which again differentiates the voltage to produce a voltage proportional to $$\frac{1}{2}\frac{d^2\Delta t_0}{dt^2}T$$

To this is added the voltage proportional to $$\frac{d\Delta t_0}{dt}$$

applied by wire 199 from repeater 195. The combined voltages cause a current to flow in the winding of potentiometer 200, of which the wiper 201 is adjusted to the value of the dead time T to select a voltage proportional to $$\frac{d\Delta t_0}{dt} \cdot T + \frac{1}{2}\frac{d^2\Delta t_0}{dt^2} \cdot T^2$$

and supplies this voltage to repeater 194. A source 202 supplies current to the winding of a potentiometer 203, which has a resistance varying with $f(\Delta t_1)$ shown in Fig. 15F. The wiper 204 of this potentiometer is moved by the shaft of the motor 205 to select a voltage proportional to $f(\Delta t_1)$, that is $Z_F$, which is also applied to the repeater 194. The voltage from the output of the repeater 194 is supplied to the modulator 206 to control the motor 205 to move the wiper 204 until the sum of the voltages from the output of the repeater 194 is zero and the wiper 204 indicates the fuse number $Z_F$. As indicated on Fig. 3, current from the source 55 is supplied to the modulator 206, and through amplifier 207 to one phase of the motor 205. Current from the phase shifter 56, Fig. 3, is supplied through amplifier 208 to the other phase of motor 205.

The repeaters, summing repeaters, and differentiating networks discussed hereinabove are shown in Figs. 10, 10A, 10B, 10C and 10D. The repeater shown in Fig. 10 includes three vacuum tubes 213, 215, 216 having interstage coupling networks of the type shown in United States Patent 1,751,527, March 25, 1930, H. Nyquist. The control grids, screen grids and anodes are energized by a common source of voltage 219, having an intermediate grounded tap 233. The cathodes are heated by the usual heater circuit (not shown). The control grid of vacuum tube 213 is negatively biased by the usual cathode biasing resistor 214.

The source 219 applies a voltage, negative with respect to ground, to the cathode of vacuum tube 216, and a voltage, positive with respect to ground, through resistor 217 to the anode of vacuum tube 216. The applied voltages are so related to the cathode-anode resistance of the vacuum tube 216 and the resistance of the resistor 217, that, in the absence of a signal voltage applied to the control grid of vacuum tube 216, the two voltages and the two resistances form a balanced bridge. The anode of vacuum tube 216 is then at ground potential and zero voltage is applied to the load 218.

In order to make the voltage applied to the load 218 exactly zero, a small adjustable voltage from the wiper of potentiometer 211, shunted across the grounded source of voltage 210, may be applied through resistor 212 to the control grid of vacuum tube 213. The small capacitor 223, and the small capacitor 225 in serial relationship with resistor 224, reduce the phase shifts in the repeater.

Let a grounded source of positive potential be connected to resistor 221, Fig. 10A, thus applying a positive potential to the control grid of vacuum tube 213, Fig. 10. A negative potential will thus be applied to the control grid of vacuum tube 215, and an amplified positive potential to the control grid of vacuum tube 216. The positive potential on the control grid of vacuum tube 216 will decrease the anode-cathode resistance of vacuum tube 216, increasing the anode current, and the voltage drop in resistor 217, and applying a negative potential across the load 218. Similarly, a negative potential applied through resistor 221 will cause a positive potential to be applied across the load 218. The repeater thus reverses the polarity of the applied voltage.

A positive potential applied to resistor 221 will tend to cause a current to flow through resistors 221, 220 and the anode-cathode path of vacuum tube 216 to ground, and will apply a positive potential to the control grid of vacuum tube 213. The positive potential on the control grid of vacuum tube 213 is amplified and applied to the control grid of vacuum tube 216, decreasing the anode-cathode resistance of vacuum tube 216 to permit the increased current to flow.

The current flow produces a voltage drop in resistor 221 which reduces the potential applied to the control grid of vacuum tube 213. This current flow will increase until the potential difference between the control grid of vacuum tube 213 and ground is reduced substantially to zero. With modern high gain tubes, this potential difference may be reduced to a small fraction of a millivolt. As the control grid of vacuum tube 213 is biased negatively and no current flows from the control grid through this vacuum tube, the whole of the applied voltage is used to force the current through resistor 221. The output voltage rises just enough to draw this current through resistor 220, and as the same current is flowing in resistors 220 and 221, the output voltage will be to the applied voltage as the resistance of resistor 220 is to the resistance of resistor 221, or, the voltage gain for this applied voltage is the ratio of the resistances of resistors 220 and 221.

If a second voltage be applied through resistor 222, this applied voltage will also tend to cause a current to flow in resistor 220, independent of the first current, and this current will increase until the potential of the control grid of vacuum tube 213 is again reduced substantially to zero. The voltage gain for this second applied voltage will be the ratio of the resistances of resistors 220 and 222.

The application of this second voltage causes the output voltage to rise still further, so as to draw the added current through resistor 220, the voltage being equal to the resistance of resistor 220 multiplied by the sum of the currents. The output voltage thus is equal to the sum of the applied voltages, each multiplied by its own voltage gain, if any.

The resistances of resistors 221, 222 are large enough that no appreciable current flows from one source of applied voltage to the other.

If a negative potential be applied, through resistor 221 or 222, to the control grid of vacuum tube 213, the current from this source will flow in the opposite direction to the current from a positive source, but the same relationships will exist, and the output voltage will be the algebraic sum of the amplified applied voltages.

If the current flows from the source to the control grid of vacuum tube 213, the output voltage is negative; if the current flows from the control grid of vacuum tube 213 to the source, the output voltage is positive.

If a potentiometer 230, Fig. 10D, be connected across the load 218, the current from a voltage source connected to the control grid of vacuum tube 213 will flow in both portions of the winding of potentiometer 230 and the wiper can be adjusted so that this current does not produce any voltage across the load 218.

Let a source of voltage, positive with respect to ground and increasing in magnitude, be connected to resistor 231, Figs. 10B and 10, so as to cause a current to flow from capacitor 232 to the control grid of vacuum tube 231. By definition, the charge on a capacitor equals the capacitance multiplied by the applied voltage. Thus, the current, which is the time rate of change of the charge, equals the capacitance multiplied by the time rate of change of the applied voltage. The resistance of the resistor 231 slightly modifies this relationship but this small error decreases rapidly with time, and this resistance acts to smooth out slight errors in the value of the derivative or time rate of change of the applied voltage. The output voltage of the repeater will thus be proportional to the time rate of change of the applied voltage. The current in resistor 220, due to this input will be algebraically added to the currents in resistor 220 due to any other inputs. Thus the output voltage will be the sum of the rate of change of the voltage applied to resistor 231 and any other voltages applied to resistors 221, 222. A positive increasing voltage or negative decreasing voltage applied to resistor 231 will produce a negative output voltage; a positive decreasing or negative increasing voltage applied to resistor 231 will produce a positive output voltage.

Figure 9:
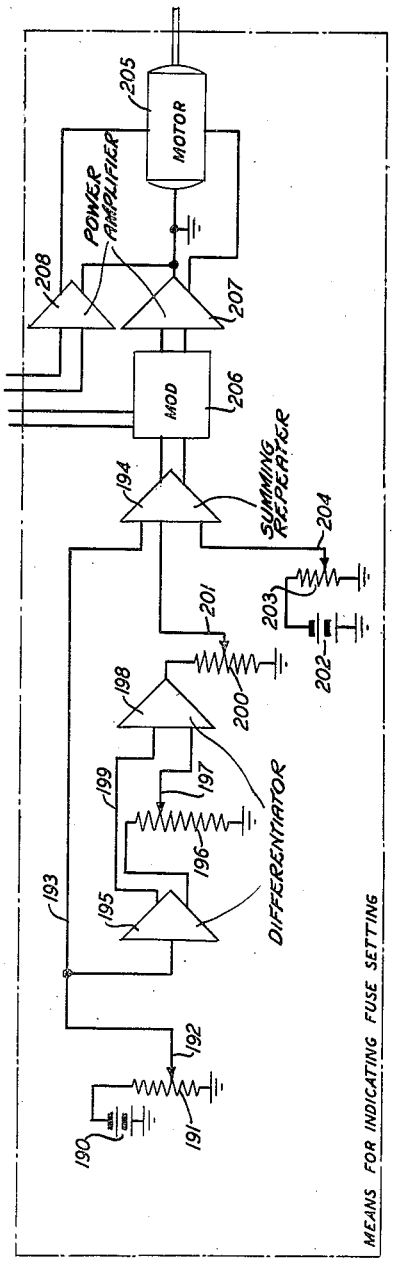
Fig. 9 is a schematic representation of a means for indicating the fuse setting.

The repeaters, such as repeater 34, Fig. 2, for differentiating the voltages proportional to the $x$, $y$ and $v$ coordinates are connected as shown in Figs. 10, 10A, 10C, 10D. The source of voltage is connected to resistor 221 and potentiometer 230 adjusted to balance the undifferentiated currents so that no voltage due to these currents is applied to the load 218. The capacitor 229 produces a current which flows through resistors 228, 226 and the output circuit of vacuum tube 216, producing a voltage across the load 218 proportional to the derivative of the applied voltage. As this current does not flow through the input resistor 221, it is not balanced out by the adjustment of potentiometer 230. The motor control repeaters 48, 78, 92, Fig. 3 and 194, Fig. 9, are connected as shown in Figs. 10, 10A, 10C. The differentiator 195, Fig. 9, is connected as shown in Figs. 10, 10B, while the summing differentiator 198, Fig. 9, is connected as shown in Figs. 10, 10A, 10B. The summing repeaters 31, 36, 63, Fig. 2; 65, 98, Fig. 3; 115, Fig. 5; 141, 144, 148, Fig. 6; and 169, 173, Fig. 7, are connected as shown in Figs. 10, 10A. The unity gain, polarity reversing repeaters 4, 5, 16, 17, 38, 40, Fig. 2; 70, 74, Fig. 3; 117, Fig. 5, are also connected as shown in Figs. 10, 10A.

In case of slight variations from this ideal condition, the potentiometer 211 may be adjusted to make the potential across the load 218 equal zero. Now, if a source of potential be applied through resistor 221, Fig. 10A, to the input of tube 213, this balance will be upset, and a voltage drop, equal to the applied potential, will be produced across the load 218. If a second potential be applied through resistor 222, Fig. 10A, a voltage drop equal to the sum of the applied voltages will be produced across the load 218. This type of summing repeater is disclosed in United States Patent 2,401,779, patented June 11, 1946, by K. D. Swartzel, Jr., and assigned to the assignee of the present application. The repeaters 4, 5, 16, 17, 31, 38, 36, 40, 58, 63, 65, 70, 74, Fig. 2; 115, 117, Fig. 5; 151, 144, 148, Fig. 6; 169, 173, Fig. 7, are of this type, having one or more sources of potential applied to the input circuit. As there is a reversal of polarity in passing through each stage, the potential across the load 218 is reversed in polarity with respect to the input potential. A small capacitor 223 may be connected across the input of tube 213, and a resistor 224 in serial relationship with a capacitor 225 may be connected from the grid of tube 216 to ground to correct any phase shift in the repeater.

With every change in the voltages from the repeaters 48, 78, 92, Fig. 3, and 194, Fig. 9, the corresponding motor should rapidly rotate in a direction and to an amount proportional to the polarity and amplitude of the voltage. The motor should not overrun the desired position, nor oscillate about the desired position. It may be shown that this action will be attained if the motor be controlled, not only by the control voltage, but also by the first differential of the control voltage. Such a voltage is produced in the output circuit of the repeaters 48, 79, 92, Fig. 3, and 194, Fig. 9.

Fig. 3 shows in detail a typical control circuit for motor 45. Similar circuits are used to control motors 32, 73, 205. Current from a suitable source 55 flows through a phase shifter 56 and power amplifier 57 to one winding of a two-phase motor 45. A two-phase generator may replace the source 55 and phase shifter 56. Current also flows through the network 58 and power amplifier 59 to the other winding of the motor 45. For rapid operation, the rotor is preferably unwound and of light weight. The rotor shaft drives the wipers, such as 42, 41, Fig. 2, 101, Fig. 4, 122, 124, 125, Fig. 5, etc. either directly or through suitable gearing. The movement of these wipers reduces the input voltage to zero at the desired position. The network 58 comprises an input transformer 241 and an output transformer 242, and four non-linear resistors 243, 244, 245 and 246. The non-linear resistors may be the known copper-copper-oxide couples. The resistors 243, 244, 245, 246 are connected so that, with current flowing as shown by the arrows, the resistance of the resistor is low. The voltage from the output of the repeater 48 may be of either polarity. When the wire 247 is positive, current will flow into the mid-tap of the transformer 241 through resistors 243, 244 to the mid-tap of transformer 242, thence over wire 248, to repeater 48. Resistors 243, 244, will be of low resistance, while resistors 245, 246 will be of high resistance. Thus, assuming the alternating current to flow downward in the secondary winding of the transformer 241, the alternating current will flow through resistor 244, upward in primary winding of transformer 242, resistor 243 to winding of transformer 241. The upward flow in the primary winding of transformer 242 will correspond to one direction of rotation of the motor 45. When the wire 248 is positive, current will flow into the mid-tap of transformer 242, through resistors 245, 246, winding of transformer 241 to mid-tap and wire 247. Resistors 245, 246 will be of low resistance and resistors 243, 244 of high resistance. Now, assuming as before that the alternating current flows downward in the secondary winding of transformer 241, the alternating current will flow through resistor 245, downward in primary winding of transformer 242, resistor 246 to winding of transformer 241. This reversal of the direction of flow in the transformer 242 is a reversal of one phase of the motor 45 and will cause the motor 45 to run in the opposite direction.

Preferably, the complete director, and all components associated therewith, is supplied by a common source of current. This source should be grounded at an intermediate point, and both poles connected as required by the circuits. Other taps may be made for intermediate voltages. The source may be a storage battery, or a rectifier and filter set having good voltage regulation. When all the circuits are supplied from the same source, all the factors in the data will change to an equal degree with changes in the source and the accuracy of the result will be unimpaired.

In many cases two or more wipers, such as wipers 6, 7, 8 and 21, 22, 23, 24 and 41, 42, Fig. 2, are shown as driven by a common shaft. It will be understood that such wipers are insulated in known manner from each other, and from the shaft. The fuse setting, azimuth angle and elevation angle may be read from suitable dials as indicated in Fig. 3 at 258, 259 and 260 respectively.

What is claimed is:

1. In an artillery director in which the data of the position of the target are expressed in the form of voltages, means for modifying said voltages for the muzzle velocity of the gun, the drift of the shell, the density of the air and the prevailing wind which comprises means for generating voltages proportional to the maximum values of said corrections, means for selecting a portion of said generated voltages proportional to the elevation of the gun, additional means for selecting a portion of said selected voltages proportional to the time of flight of the shell, other means for fractionating said voltages proportionally to the actual value of the corrections means for combining said latter voltages with said voltages representing the data, and means for indicating the values of the data proportional to said combined voltages.

2. In an artillery director, means for locating and tracking a target, means associated with said tracking means for representing the present position of the target in polar coordinates, means for converting the representations of said polar coordinates into representations of the rectangular coordinates, means for deriving from the representations of said rectangular coordinates a representation of the rectangular coordinates of the predicted position of the target with respect to the gun, means for converting said derived rectangular coordinates into components normal to the direction from the gun to the target, a horizontal component and a vertical component, means for modifying said normal component for the normal component of drift and wind, means for modifying the horizontal component for the in-line component of wind, muzzle velocity and air density, means for modifying the vertical component for the vertical component of wind, muzzle velocity and air density, means for further modifying said vertical component for the superelevation of the gun, means for deriving from said modified normal components and indicating the azimuthal angle of the gun, and means for deriving from said modified horizontal component and superelevated component and indicating the quadrant angle of the gun.

3. Means for indicating the azimuthal angle of a gun directed to a moving target which comprises means for continuously measuring the polar coordinates of the present position of the target with respect to the point of observation and a selected axis, means for converting the representations of said observations into representations of the rectangular coordinates of the predicted position of the target with respect to the gun, means for converting the representations of said rectangular coordinates into representations of components normal to the direction from gun to target, means for modifying the representations of said components for drift, wind, and means for converting said modified representations into an indication of the azimuthal angle.

4. Means for indicating the quadrant angle of a gun directed to a moving target which comprises means for continuously measuring the polar coordinates of the present position of the target with respect to the point of observation and a selected axis, means for converting said observations into representations of the horizontal and vertical coordinates of the predicted position of the target with respect to the gun, means for modifying said representations for the horizontal and vertical effects of the in-line component of the wind and for muzzle velocity and air density, means for further modifying the representation of the vertical coordinate for superelevation and means for converting said modified representations into an indication of the quadrant angle.

5. In a system for directing a shell from a gun to a target, a source of voltage having an intermediate point grounded and two free poles, a potentiometer having an intermediate point grounded and two wipers, a reversing switch, means for connecting the free poles of said source of voltage through said switch to the wipers of said potentiometer, a motor moved proportionately to the quadrant angle of the gun, a second potentiometer having a winding grounded at an intermediate point, the free ends of said winding being connected to the free ends of the winding of said first potentiometer and a wiper driven by said motor, a third potentiometer having a winding connected between the wiper of said second potentiometer and ground and a wiper, a second motor controlling the movement of the wiper of said third potentiometer, and means for applying the voltage with respect to ground on said wiper to assist in the control of both said motors.

6. In a system for directing a shell from a gun to a target, a grounded source of voltage proportional to the muzzle velocity of the gun, a potentiometer having a winding grounded at both ends and a wiper connected to the free pole of said source, a motor driving said wiper, a second potentiometer having a winding connected between the wiper of said first potentiometer and ground, a wiper for said second potentiometer, a second motor for moving the wiper of said second potentiometer in proportion to the time of flight of the shell, and means for applying the voltage with respect to ground of the wiper of said second potentiometer to assist in the control of said first motor.

7. Means for indicating the time of flight of a shell from a gun to a moving target which comprises means for measuring the polar coordinates with respect to the plane of observation and a selected axis of the present position of the target, means for producing in accordance with said measurements two voltages varying in proportion to the rectangular coordinates of the predicted position of the target with respect to the gun, and a third voltage proportional to the vertical height from the plane of the gun to the predicted position of the target, means for deriving from said first two voltages a fourth voltage proportional to the horizontal distance from the gun to the projection of the target, means for combining said fourth voltage with voltages proportional to the horizontal components of the corrections for the density of the air, the muzzle velocity of the gun and the wind to produce a fifth voltage proportional to the horizontal distance from the gun to the projection of the virtual position, means for combining said third voltage with voltages proportional to the vertical components of the corrections for the density of the air, the muzzle velocity of the gun and the wind, for combining said modified third voltage with a voltage proportional to the vertical superelevation of the line of the gun to produce a sixth voltage proportional to the corrected superelevated height through the predicted position of the target, means for converting said fifth and sixth voltages into a seventh voltage proportional to the slant distance from the gun to the position of superelevation as modified for the quadrant angle of the gun, means for generating a standard voltage, means for selecting a portion of said standard voltage, means for comparing said selected standard voltage with said seventh voltage, and means for adjusting the point of selection to make said voltages equal, whereby the point of selection indicates the time of flight of the shell.

8. In the system set forth in claim 7, the means for selecting the corrected fuse number which comprises means for generating a voltage proportional to the maximum time of flight of the shell, means for selecting a portion of said generated voltage proportional to the time of flight, means for adjusting said point of selection simultaneously with and proportionally to the adjustment indicating the time of flight of the shell, means for deriving a third voltage proportional to the rate of change of said selected voltage, means for selecting a portion of said third voltage proportional to the dead time, means for deriving a fourth voltage proportional to the rate of change of the selected portion of said third voltage, means for selecting a portion of said fourth voltage proportional to one half the dead time, means for combining the selected portion of said generated voltage, said third voltage, and said fourth voltage to form a control voltage, means for generating a standard voltage, means for selecting a portion of said standard voltage, means for comparing said control voltage with the selected portion of said standard voltage, and means for adjusting said selected portion of said standard voltage to equal said control voltage whereby the point of selection of said standard voltage indicates the corrected fuse number.

9. In a gun data computer, a source of voltage, mechanism connected to said source and controlled in accordance with observations of a target to form the sources of a first and second voltage respectively proportional to the rectangular coordinates with respect to an arbitrary axis of the projection of the predicted position of the target with respect to the gun and having a first shaft rotated proportionally to the time of flight of a shell to said predicted position, a second shaft, a first potentiometer having a winding varying in resistance with a sinusoidal function connected to the source of said first voltage and a first brush driven by said second shaft, a second potentiometer having a winding varying in resistance with a cosinusoidal function connected to the source of said second voltage and a second brush driven by said second shaft, a first network connected to said source and adjusted by both said shafts, said network being proportioned to fractionate the voltage from said source proportionally to the drift of the shell laterally of the line of fire, a second network connected to said source and adjusted to select a voltage proportional to the velocity of the wind, a third network connected to said second network and adjusted by both said shafts, said third network being proportioned to fractionate the voltage from said second network proportionally to the effect of the wind on the shell laterally of the line of fire, a motor driving said second shaft and an amplifier having an input circuit connected to both said brushes and said first and third networks to oppose the voltage from said second brush to the other voltages and an output circuit connected to said motor whereby said second shaft is rotated to the firing azimuth of said gun.

10. In a gun data computer including a source of energy and mechanism connected to said source and controlled in accordance with observations of a target to form with said source the sources of a first and a second quantity of energy respectively proportional to the rectangular coordinates with respect to an arbitrary axis of the projection of the predicted position of the target with respect to the gun and having a first shaft rotated proportionally to the time of flight of a shell from the gun to said predicted position, a second shaft, means connected to the source of said first quantity of energy and adjusted by said second shaft to fractionate said quantity proportionally to the sine of the angle of rotation of said second shaft, second means connected to the source of said second quantity of energy and adjusted by said second shaft to fractionate said second quantity proportionally to the cosine of the angle of rotation of said second shaft, third means connected to said source of energy and adjusted by both said shafts, said third means being proportioned to produce a quantity of energy proportional to the drift of the shell laterally of the line of fire, fourth means connected to said source of energy and adjusted by both said shafts, said fourth means being proportioned to produce a quantity of energy proportional to the displacement of the shell laterally of the line of fire due to the wind, motor means driving said second shaft, and comparison means connected to said first, second, third and fourth means to oppose the energy from said first means to the energy from the other means, and to said motor means, whereby said second shaft is rotated to the firing azimuth of said gun.

11. In a gun data computer including a source of voltage and mechanism connected to said source and controlled in accordance with observations of a target to form the sources of a first and a second voltage respectively proportional to the horizontal coordinates of the projection of the predicted position of the target with respect to the gun and having a first shaft rotated proportionally to the time of flight of a shell from the gun to said predicted position and a second shaft rotated proportionally to the quadrant elevation of the gun, a first potentiometer having a winding varying in resistance with a sinusoidal function connected to the source of said first voltage and a first brush, a second potentiometer having a winding varying in resistance with a cosinusoidal function connected to the source of said second voltage and a second brush, a first rheostat having a winding connected to one pole of said source and a third brush connected to the other pole of said source, a second rheostat having a winding connected across the winding of said first rheostat and a fourth brush, a third rheostat having a winding connected to one pole of said source and a fifth brush adjusted to the velocity of the wind, a fourth rheostat having a winding connected across the winding of said third rheostat and a sixth brush, a third potentiometer having a winding varying in resistance with a sinusoidal function connected to said sixth brush and a seventh brush, a fifth rheostat having a winding connected to said seventh brush and an eighth brush, said fourth and sixth brushes being driven by said first shaft, said third, and eighth brushes being driven by said second shaft, a motor driving said first, second and seventh brushes, and an amplifier having an input circuit connected to said first, second, fourth and eighth brushes and an output circuit connected to said motor.

12. In a gun data computer including a source of voltage and mechanism connected to said source and controlled in accordance with observations of a target to form sources of a first and a second voltage respectively proportional to the horizontal and vertical distances from a gun to the predicted position of the target, a first shaft, a second shaft, a first set of networks connected to said source of voltage and adjusted by both said shafts, said networks being proportioned to produce voltages together proportional to the horizontal components of the differential ballistic effects on a shell from said gun, a first amplifier having an input circuit connected to the source of said first voltage and to said first set of networks and an output circuit, a second set of networks connected to said source of voltage and adjusted by both said shafts, said networks being proportioned to produce voltages together proportional to the vertical components of the differential ballistic effects on said shell, a second amplifier having an input circuit connected to the source of said second voltage and to said second set of networks and an output circuit, first means connected to the output circuit of said first amplifier and adjusted by said first shaft to select a voltage proportional to the sine of the angle of rotation of said first shaft, second means connected to the output circuit of said second amplifier and adjusted by said first shaft to select a voltage proportional to the cosine of the angle of rotation of said first shaft, a first motor driving said first shaft, a third amplifier having an input circuit connected to said first and second means to oppose the voltages from said means and an output circuit connected to said first motor, whereby said first motor is rotated proportionally to the quadrant elevation of the gun, third means connected to the output circuit of said first amplifier and adjusted by said first shaft to select a voltage substantially proportional to the cosine of the quadrant elevation, fourth means connected to said second amplifier and adjusted by said first shaft to select a voltage substantially proportional to the sine of the quadrant elevation, a third set of networks connected to the output circuits of said first and second amplifiers and adjusted by said second shaft, a potentiometer having a winding connected to said source and a brush driven by said second shaft, a second motor driving said second shaft, and a fourth amplifier having an input circuit connected to said third and fourth means, said third set of networks and said brush to oppose the voltage from said brush to the other voltages and an output circuit connected to said second motor whereby said second motor is rotated proportionally to the time of flight of the shell.

13. The combination in claim 12 in which one of the networks of the first set includes a first rheostat having a winding connected to one pole of said source of voltage and a first brush connected to the other pole of said source and adjusted to select a voltage proportional to the muzzle velocity of the gun, a second rheostat having a winding connected across the winding of said first rheostat and a second brush adjusted by said second shaft, a third rheostat having a winding connected to said second brush and a third brush adjusted by said first shaft and connected to the input circuit of said first amplifier, a fourth rheostat having a winding connected at both ends to one pole of said source and a fourth brush connected to the free end of the winding of said first rheostat and adjusted by said first shaft, a fifth rheostat having a winding connected to said fourth brush and a fifth brush adjusted by said second shaft and connected to the input circuit of said first amplifier, the windings of said second, third, fourth, and fifth rheostats being proportioned so that the voltages selected by said third and fifth brushes are together proportional to the horizontal component of the effect on the shell of the muzzle velocity of the gun.

14. The combination in claim 12 in which one of the networks of the first set includes a first rheostat having a winding connected to one pole of said source of voltage and a first brush connected to the other pole of said source and adjusted to the value of the deviation from standard of the density of the air, a second rheostat having a winding connected across the winding of said first rheostat and a second brush adjusted by said first shaft, a third rheostat having a winding connected to said second brush and a third brush adjusted by said second shaft and connected to the input circuit of said first amplifier, the windings of said second and third rheostats being proportioned so that the voltage selected by said third brush is proportional to the horizontal component of the effect on the shell of the density of the air.

15. The combination in claim 12 in which one of the networks of the first set includes a first rheostat having a winding connected to one pole of said source of voltage and a first brush connected to the other pole of said source and adjusted proportionally to the velocity of the wind, a second rheostat having a winding connected across the winding of the first rheostat and a second brush adjusted by said second shaft, a potentiometer having a winding connected to said second brush and a third brush adjusted to select a voltage proportional to the cosine of the angle between the wind direction and the line of fire, a third rheostat having a winding connected to said third brush and a fourth brush connected to the input circuit of said first amplifier and adjusted by said first shaft, the windings of said second and third rheostats being proportioned so that the voltage selected by said fourth brush is proportional to the horizontal component of the effect on the shell of the wind.

16. The combination in claim 12 in which one of the networks of the second set includes a first rheostat having a winding connected to one pole of said source of voltage and a first brush connected to the other pole of said source and adjusted proportionally to the velocity of the wind, a second rheostat having a winding connected across the winding of the first rheostat and a second brush adjusted by said second shaft, a potentiometer having a winding connected to said second brush and a third brush adjusted to select a voltage proportional to the cosine of the angle between the wind direction and the line of fire, a third rheostat having a winding connected at both ends to one pole of said source and a fourth brush adjusted by said first shaft and connected to said third brush and the input circuit of said second amplifier the windings of said second and third rheostats being proportioned so that the voltage selected by said fourth brush is proportional to the vertical component of the effect on the shell of the wind.

17. The combination in claim 12 in which one of the networks of the second set includes a first rheostat having a first and a second brush respectively connected to the poles of said source of voltage and a winding grounded at an intermediate tap, said brushes being adjusted proportionally to the muzzle velocity of the gun, a second rheostat having a winding connected in parallel with the winding of said first rheostat and a third brush adjusted by said first shaft, a third rheostat having a winding connected to said third brush and a fourth brush adjusted by said second shaft and connected to the input circuit of said second amplifier, the windings of said second and third rheostats being proportioned so that the voltage selected by said fourth brush is proportional to the vertical component of the effect on the shell of the muzzle velocity of the gun.

18. The combination in claim 12 in which one of the networks of the second set includes a first rheostat having first and second brushes respectively connected to the pole of said source of voltage and a winding grounded at an intermediate tap, said brushes being adjusted proportionally to the density of the air, a second rheostat having a winding connected in parallel with the winding of said first rheostat and a third brush adjusted by said first shaft, a third rheostat having a winding connected to said third brush and a fourth brush adjusted by said second shaft and connected to the input circuit of said second amplifier, the windings of said second and third rheostats being proportioned so that the voltage selected by said fourth brush is proportional to the vertical component of the effect on the shell of the density of the air.

19. The combination in claim 12 in which the third set of networks includes a first rheostat having a winding connected to the output circuits of both said first and second amplifiers and a first brush adjusted by said second motor and connected to the input circuit of said fourth amplifier, and a second rheostat having a winding connected to the output circuit of said first amplifier and a second brush adjusted by said second motor and connected to the input circuit of said fourth amplifier.

20. In an artillery director including a first motor controlled to move substantially in accordance with the quadrant elevation of a gun and a second motor controlled to move substantially in accordance with the time of flight of the shell, a source of voltage, a first potentiometer having a wiper connected to said source and moved by said first motor and a winding, a second potentiometer having a winding connected in serial relationship with the winding of said first potentiometer and a wiper moved by said second motor, and means for utilizing the voltage selected by the wiper of the second potentiometer to assist in the control of both said motors.

21. In combination with a first motor controlled to rotate substantially proportionally to a first phenomenon and a second motor controlled to rotate substantially proportionally to a second phenomenon, a source of voltage, a first potentiometer having a wiper connected to said source and moved by said first motor and a winding, a second potentiometer having a winding connected in serial relationship with the winding of said first potentiometer and a wiper moved by said second motor, and means for utilizing the voltage selected by the wiper of the second potentiometer to assist in the control of both said motors.

22. In a computer for directing the line of departure of a shell to a virtual position such that the shell may burst at the predicted future position of the target including first means driven by an azimuth motor, an elevation motor, and a time motor and controlled in accordance with observations of the present position and movement of a target to produce first and second voltages respectively proportional to the components normal to the plane of departure and third and fourth voltages respectively proportional to the components in the plane of departure of the horizontal rectangular coordinates with respect to an arbitrary axis of the projection of the future position of the target and a fifth voltage proportional to the superelevated height of the line of departure above the future position of the target, a source of voltage, second means connected to said source, conjointly controlled by all said motors and adjusted to produce a sixth voltage proportional to the linear deflection of the shell due to drift and cross-wind, first summing means connected to said first and second means and said azimuth motor to oppose said first voltage to the sum of said second an sixth voltages and to drive said azimuth motor to make the resultant voltage zero, third means connected to said source, conjointly controlled by all said motors and adjusted to produce a seventh voltage proportional to the horizontal effect on the shell in the plane of departure of the wind and non-standard air density and muzzle velocity, second summing means connected to said first and third means to combine said third, fourth and seventh voltages, fourth means connected to said source, conjointly controlled by all said motors and adjusted to produce an eighth voltage proportional to the vertical effect on the shell of the wind and non-standard air density and muzzle velocity, third summing means connected to said first and fourth means to combine said fifth and eighth voltages, fifth means connected to said second and third summing means and controlled by said elevation motor to derive from the outputs of said summing means ninth, tenth, eleventh and twelfth voltages respectively proportional to the components in the plane of departure normal to and in the line of departure of the horizontal and vertical coordinates of the vertical position, sixth means connected to said fifth means and said elevation motor to oppose said ninth and tenth voltages and to drive said elevation motor to make the resultant voltage zero, a first network connected to said source and adjusted by said time motor, a second network connected to said second and third summing means and adjusted by said time motor, seventh means connected to said fifth means, both said networks and said time motor to oppose said eleventh and twelfth voltages to the outputs of said networks and to drive said time motor to make the resultant voltage zero, whereby said motors are respectively driven proportionally to the firing azimuth and quadrant elevation to the virtual position and the time of flight to the future position.

23. In a computer for indicating the azimuth angle with respect to an arbitrary axis of the plane of departure of a shell to the virtual position of a target including means driven by an elevation motor and a time of flight motor and controlled in accordance with observations of the present position of the target to produce first and second quantities of energy respectively proportional to the horizontal rectangular coordinates with respect to said axis of the projection of the predicted position of the target, an azimuth motor, second means connected to said first means and driven by said azimuth motor to derive from said quantities of energy third and fourth quantities of energy respectively proportional to the components of said coordinates normal to the plane of departure, a source of energy, third means connected to said source and conjointly controlled by said elevation and time of flight motors to produce a fifth quantity of energy proportional to the linear effect laterally of said plane of the drift of the shell, fourth means connected to said source, conjointly controlled by all said motors and adjusted to produce a sixth quantity of energy proportional to the linear effect laterally of said plane of the cross-wind and fifth means connected to said second, third and fourth means and said azimuth motor to oppose said third quantity of energy to the sum of said fourth, fifth and sixth quantities of energy and to drive said azimuth motor to make the resultant of said quantities zero, whereby said azimuth motor is driven proportionally to said azimuth angle.

24. In a computer for indicating the quadrant elevation of the line of departure, to the virtual position of a target which includes first means driven by an azimuth motor and a time of flights motor and controlled in accordance with observations of the present position and movement of the target to produce first and second quantities of energy respectivly proportional to the horizontal distance from the gun to the projection of the predicted position of the target and the superelevated height of the virtual position with respect to the gun, a source of energy, an elevation motor, second means connected to said source, conjointly controlled by all said motors and adjusted to produce a third quantity of energy proportional to the horizontal effect of the range wind and the horizontal effect of non-standard air density and muzzle velocity, first summing means connected to said first and second means to add said first and third quantities of energy to produce a fourth quantity of energy proportional to the distance to the projection of the virtual position, third means connected to said source, conjointly controlled by all said motors and adjusted to produce a fifth quantity of energy proportional to the vertical effect of the range wind and the vertical effect of non-standard air density and muzzle velocity, second summing means connected to said first and third means to add said second and fifth quantities of energy to produce a sixth quantity of energy proportional to the height of the virtual position, fourth means connected to said first and second summing means and driven by said elevation motor to derive from said fourth and sixth quantities of energy seventh and eighth quantities of energy respectively proportional to the components of said distance and said height normal to the line of departure, fifth means connected to said fourth means and said elevation motor to oppose said seventh and eighth quantities of energy and to drive said elevation motor to make the resultant quantity zero whereby said elevation motor is moved proportionally to the quadrant elevation.

WILLIAM H. BOGHOSIAN.
SIDNEY DARLINGTON.
HENRY G. OCH.

REFERENCES CITED

The following references are of record in the file of this patent:

UNITED STATES PATENTS

| Number | Name | Date |
|---|---|---|
| 1,916,706 | Wittkuhns et al. | July 4, 1933 |
| 2,113,436 | Williams | Apr. 5, 1938 |
| 2,401,779 | Swartzel, Jr. | June 11, 1946 |
| 2,408,081 | Lovell et al. | Sept. 24, 1946 |

FOREIGN PATENTS

| Number | Country | Date |
|---|---|---|
| 167,191 | Great Britain | Apr. 24, 1919 |
| 164,765 | Great Britain | June 23, 1921 |
| 458,274 | Great Britain | 1936 |
| 848,350 | France | July 24, 1939 |